(12) United States Patent
Morita et al.

(10) Patent No.: US 11,506,850 B2
(45) Date of Patent: Nov. 22, 2022

(54) OPTICAL CONNECTOR, OPTICAL CABLE, AND ELECTRONIC DEVICE

(71) Applicant: SONY GROUP CORPORATION, Tokyo (JP)

(72) Inventors: Hiroshi Morita, Tokyo (JP); Kazuaki Toba, Tokyo (JP); Masanari Yamamoto, Tokyo (JP); Yusuke Oyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/309,549

(22) PCT Filed: Nov. 21, 2019

(86) PCT No.: PCT/JP2019/045593
§ 371 (c)(1),
(2) Date: Jun. 4, 2021

(87) PCT Pub. No.: WO2020/121770
PCT Pub. Date: Jun. 18, 2020

(65) Prior Publication Data
US 2022/0035111 A1     Feb. 3, 2022

(30) Foreign Application Priority Data
Dec. 13, 2018   (JP) .............................. JP2018-233319

(51) Int. Cl.
*H04B 10/00*      (2013.01)
*G02B 6/42*       (2006.01)

(52) U.S. Cl.
CPC ......... *G02B 6/4284* (2013.01); *G02B 6/4214* (2013.01); *G02B 6/4239* (2013.01)

(58) Field of Classification Search
CPC combination set(s) only.
See application file for complete search history.

(56) References Cited

U.S. PATENT DOCUMENTS

| 2,792,751 A | * | 5/1957 | Kenneth | G02B 13/10 359/837 |
| 2,828,670 A | * | 4/1958 | Luboshez | G02B 13/10 359/678 |

(Continued)

FOREIGN PATENT DOCUMENTS

| EP | 0758755 A2 * | 2/1997 | ........... G02B 6/4206 |
| EP | 758755 A2 * | 2/1997 | ........... G02B 6/4206 |

(Continued)

OTHER PUBLICATIONS

International Search Report and Written Opinion of PCT Application No. PCT/JP2019/045593, dated Jan. 28, 2020, 10 pages of ISRWO.

*Primary Examiner* — Agustin Bello
(74) *Attorney, Agent, or Firm* — Chip Law Group

(57) ABSTRACT

The coupling loss of optical power on a reception side due to an axis deviation on a transmission side is satisfactorily mitigated. A connector body including an optical path adjusting unit and a lens is provided. The optical path adjusting unit adjusts an optical path such that the diameter of incident light is reduced while the incident angle is kept. The lens collects light whose optical path has been adjusted, and causes the light to be incident on a light receiver. For example, light incident on the optical path adjusting unit is collimated light. Furthermore, for example, the optical path adjusting unit has a through hole in a central portion. While the incident angle of light to the light receiver satisfies an NA, the focal distance of the lens is decreased. This can mitigate the coupling loss of optical power on a reception side due to an axis deviation on a transmission side.

17 Claims, 19 Drawing Sheets

(56) References Cited

U.S. PATENT DOCUMENTS

| | | | | |
|---|---|---|---|---|
| 4,580,879 A * | 4/1986 | Wilson | G02B 13/10 | 359/837 |
| 4,855,761 A * | 8/1989 | Hiiro | G06K 15/12 | 359/206.1 |
| 4,872,747 A * | 10/1989 | Jalkio | G02B 27/0972 | 359/737 |
| 4,948,233 A * | 8/1990 | Maruyama | G02B 27/0972 | 359/834 |
| 5,031,991 A * | 7/1991 | Nakatsu | G02B 6/4206 | 385/33 |
| 5,321,717 A * | 6/1994 | Adachi | G02B 6/4206 | 372/100 |
| 5,596,456 A * | 1/1997 | Luecke | G02B 27/09 | 359/837 |
| 5,625,499 A * | 4/1997 | Chen | G02B 5/1814 | 359/569 |
| 5,787,107 A * | 7/1998 | Leger | G02B 19/0057 | 372/71 |
| 5,825,555 A * | 10/1998 | Oono | G02B 27/0972 | 359/668 |
| 6,108,355 A * | 8/2000 | Zorabedian | H01S 5/141 | 372/19 |
| 6,120,191 A * | 9/2000 | Asakura | G02B 6/4206 | 385/33 |
| 6,125,222 A * | 9/2000 | Anthon | H01S 5/146 | 385/33 |
| 6,400,513 B1 * | 6/2002 | Southwell | G02B 27/123 | 372/71 |
| 6,493,148 B1 * | 12/2002 | Anikitchev | G02B 27/143 | 359/618 |
| 6,498,875 B1 | 12/2002 | Jiang et al. | | |
| 6,504,975 B1 * | 1/2003 | Yamagata | G02B 5/1876 | 385/33 |
| 6,516,011 B1 * | 2/2003 | Treusch | G02B 27/126 | 372/9 |
| 6,771,686 B1 * | 8/2004 | Ullman | G02B 27/0961 | 372/92 |
| 6,795,473 B1 * | 9/2004 | Kleinschmidt | H01S 3/08004 | 372/60 |
| 6,888,679 B2 * | 5/2005 | Brown | G02B 19/0057 | 359/636 |
| 6,922,288 B2 * | 7/2005 | Yamanaka | G02B 19/0057 | 359/834 |
| 6,937,799 B2 * | 8/2005 | Matsushima | G02B 6/12004 | 385/129 |
| 7,006,549 B2 * | 2/2006 | Anikitchev | G02B 27/09 | 372/107 |
| 7,027,230 B2 * | 4/2006 | Farr | G02B 19/0014 | 385/33 |
| 7,056,037 B2 * | 6/2006 | Ozeki | G02B 6/4246 | 385/33 |
| 7,075,117 B2 * | 7/2006 | Yamada | G02B 6/4201 | 385/94 |
| 7,121,741 B2 * | 10/2006 | Furuta | G02B 6/4246 | 385/89 |
| 7,179,536 B1 * | 2/2007 | Hosoe | G02B 3/00 | |
| 7,397,616 B2 * | 7/2008 | Nagai | G02B 6/4206 | 359/741 |
| 7,481,587 B2 * | 1/2009 | Kobayashi | G02B 6/4246 | 370/464 |
| 7,708,471 B2 * | 5/2010 | Ozeki | G02B 6/4246 | 398/139 |
| 8,599,485 B1 * | 12/2013 | Cobb | G02B 27/0977 | 359/641 |
| 8,804,246 B2 * | 8/2014 | Wolak | G02B 27/30 | 359/623 |
| 8,970,963 B2 * | 3/2015 | Moffatt | G02B 27/30 | 359/639 |
| 9,014,220 B2 * | 4/2015 | Minelly | H01S 3/042 | 372/71 |
| 10,133,079 B2 * | 11/2018 | Sekine | G02B 27/106 | |
| 10,261,261 B2 * | 4/2019 | Hemenway | G02B 6/425 | |
| 10,564,361 B2 * | 2/2020 | Hemenway | G02B 19/0057 | |
| 2002/0172451 A1 * | 11/2002 | Gupta | G02B 6/3582 | 385/33 |
| 2004/0213305 A1 * | 10/2004 | Nakae | G02B 6/4213 | 372/36 |
| 2004/0252743 A1 * | 12/2004 | Anikitchev | G02B 27/09 | 372/97 |
| 2004/0252744 A1 * | 12/2004 | Anikitchev | G02B 19/0028 | 372/100 |
| 2005/0069255 A1 * | 3/2005 | Nishimura | G02B 6/4206 | 385/27 |
| 2005/0123238 A1 * | 6/2005 | Ito | G02B 13/0035 | 385/33 |
| 2006/0018609 A1 * | 1/2006 | Sonoda | G02B 6/4204 | 385/94 |
| 2007/0024959 A1 * | 2/2007 | Peterson | G02B 27/102 | 359/362 |
| 2007/0291813 A1 * | 12/2007 | Hu | G02B 19/0028 | 372/107 |
| 2014/0300971 A1 * | 10/2014 | Wolak | G02B 19/0014 | 359/641 |
| 2014/0301735 A1 * | 10/2014 | Okada | G02B 6/4206 | 398/86 |
| 2016/0011387 A1 * | 1/2016 | Arai | H01S 5/18388 | 385/33 |
| 2017/0235057 A1 * | 8/2017 | Hemenway | G02B 19/0057 | 385/24 |
| 2018/0228374 A1 * | 8/2018 | Cui | G02B 6/32 | |
| 2018/0364477 A1 * | 12/2018 | Wakabayashi | G02B 27/30 | |
| 2019/0113683 A1 * | 4/2019 | Tokutaka | G02B 6/32 | |
| 2019/0179092 A1 * | 6/2019 | Kadoya | G02B 27/283 | |
| 2019/0212497 A1 * | 7/2019 | Hemenway | G02B 27/30 | |
| 2019/0219779 A1 * | 7/2019 | Beresnev | G02B 6/4225 | |
| 2019/0341745 A1 * | 11/2019 | Sakamoto | B23K 26/0604 | |
| 2020/0310036 A1 * | 10/2020 | Yamamoto | G02B 6/32 | |
| 2020/0403697 A1 * | 12/2020 | Perlot | G02B 6/4246 | |
| 2021/0247573 A1 * | 8/2021 | Wakabayashi | G02B 6/4296 | |
| 2021/0294040 A1 * | 9/2021 | Sakai | G02B 6/30 | |
| 2021/0298585 A1 * | 9/2021 | Kigoshi | A61B 1/07 | |
| 2021/0318493 A1 * | 10/2021 | Inoue | G02B 6/43 | |
| 2022/0035111 A1 * | 2/2022 | Morita | G02B 6/4214 | |

FOREIGN PATENT DOCUMENTS

| | | | | |
|---|---|---|---|---|
| EP | 1148357 A2 * | 10/2001 | | G02B 6/12004 |
| JP | 5-333245 A | 12/1993 | | |
| JP | 2017142450 A * | 8/2017 | | |
| WO | 2017/056889 A1 | 4/2007 | | |
| WO | WO-2021030721 A * | 2/2021 | | |

\* cited by examiner

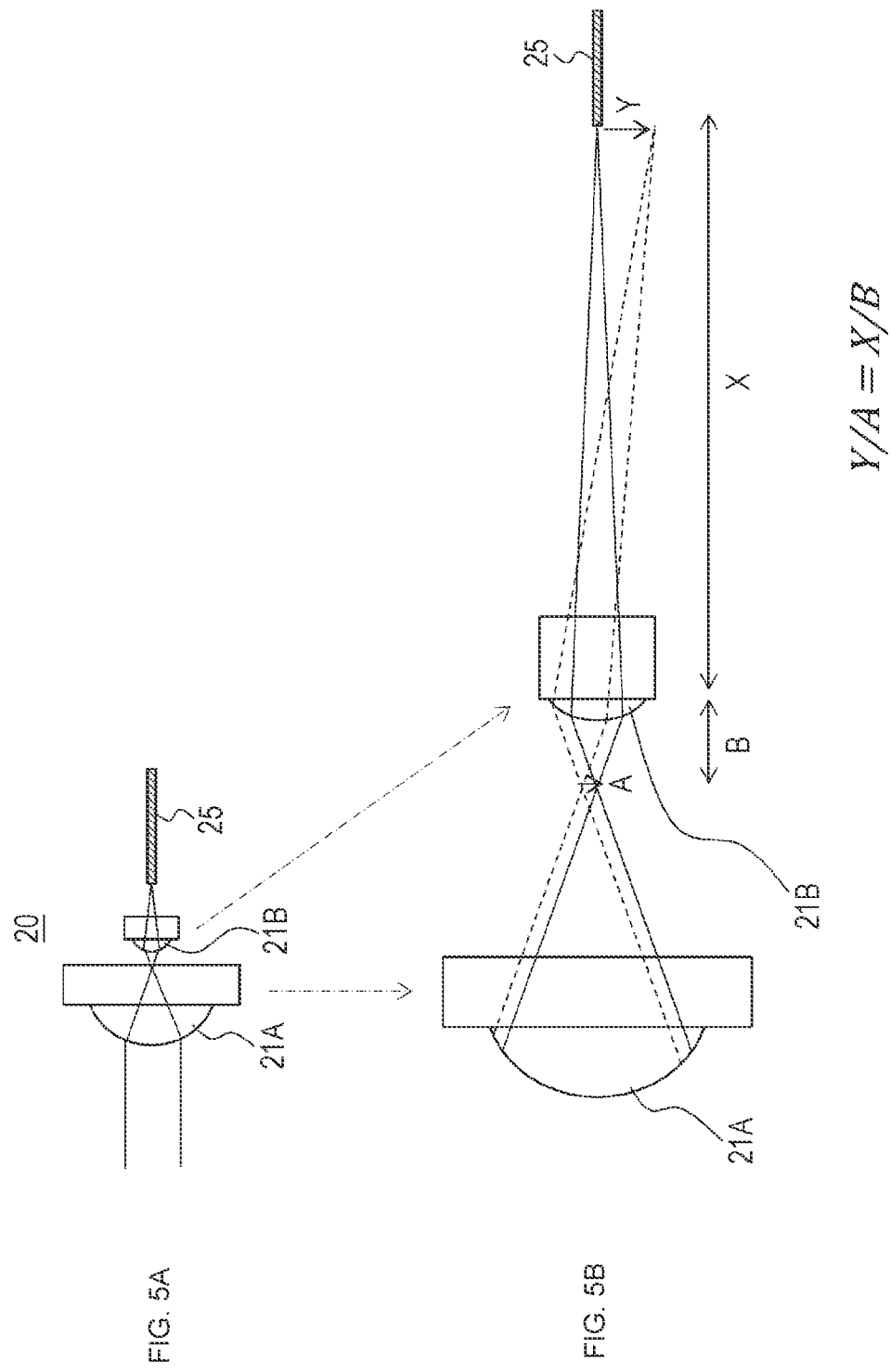

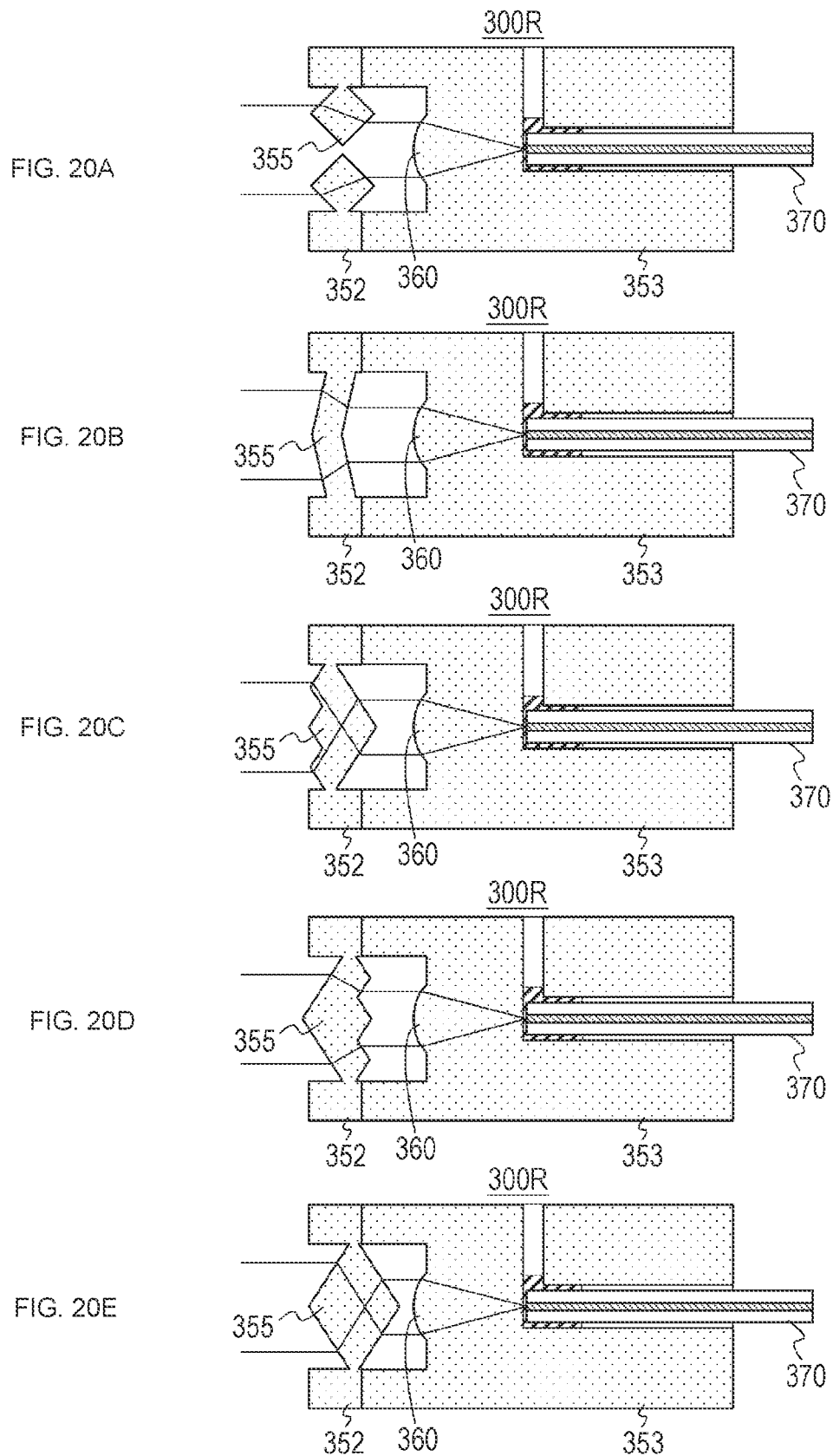

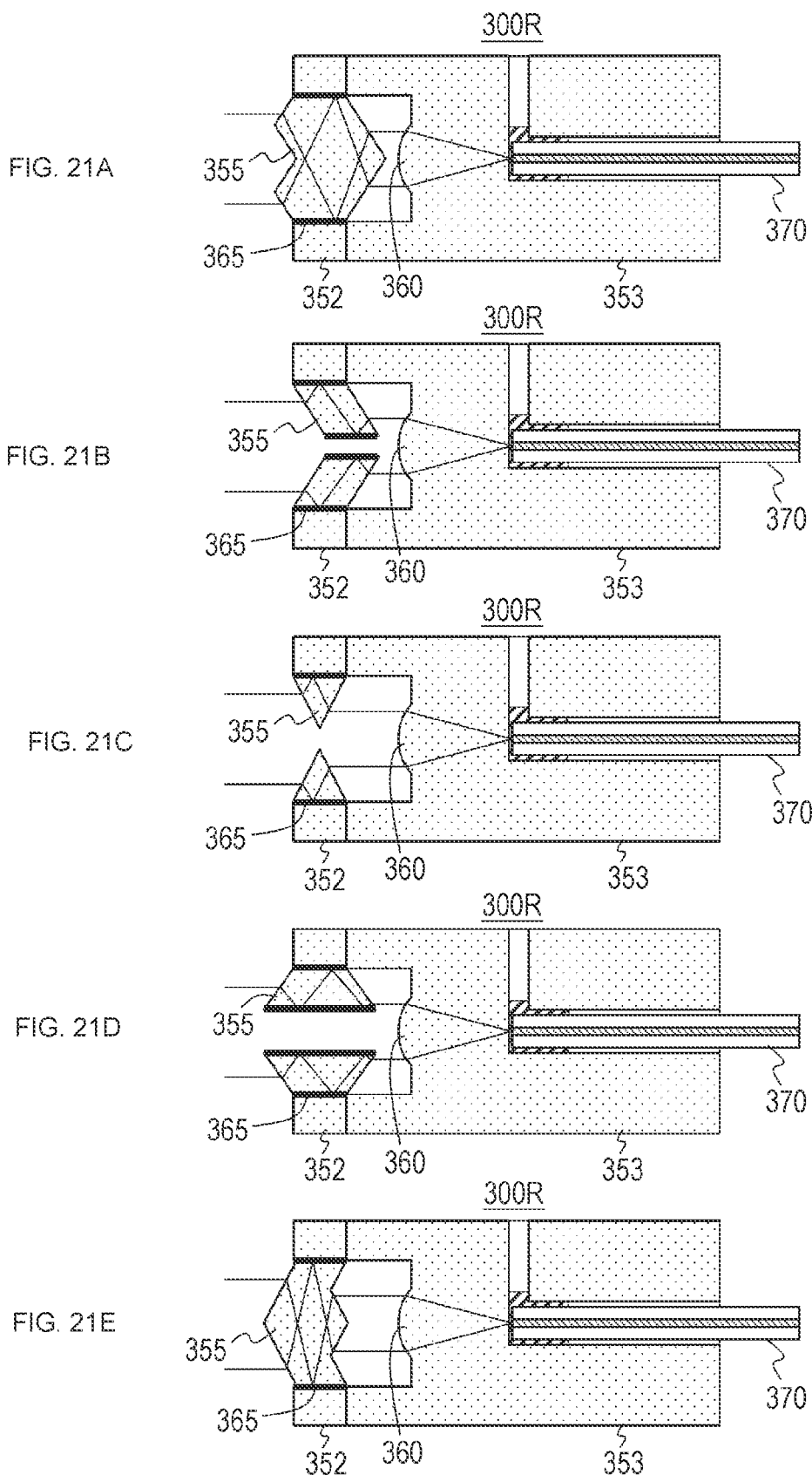

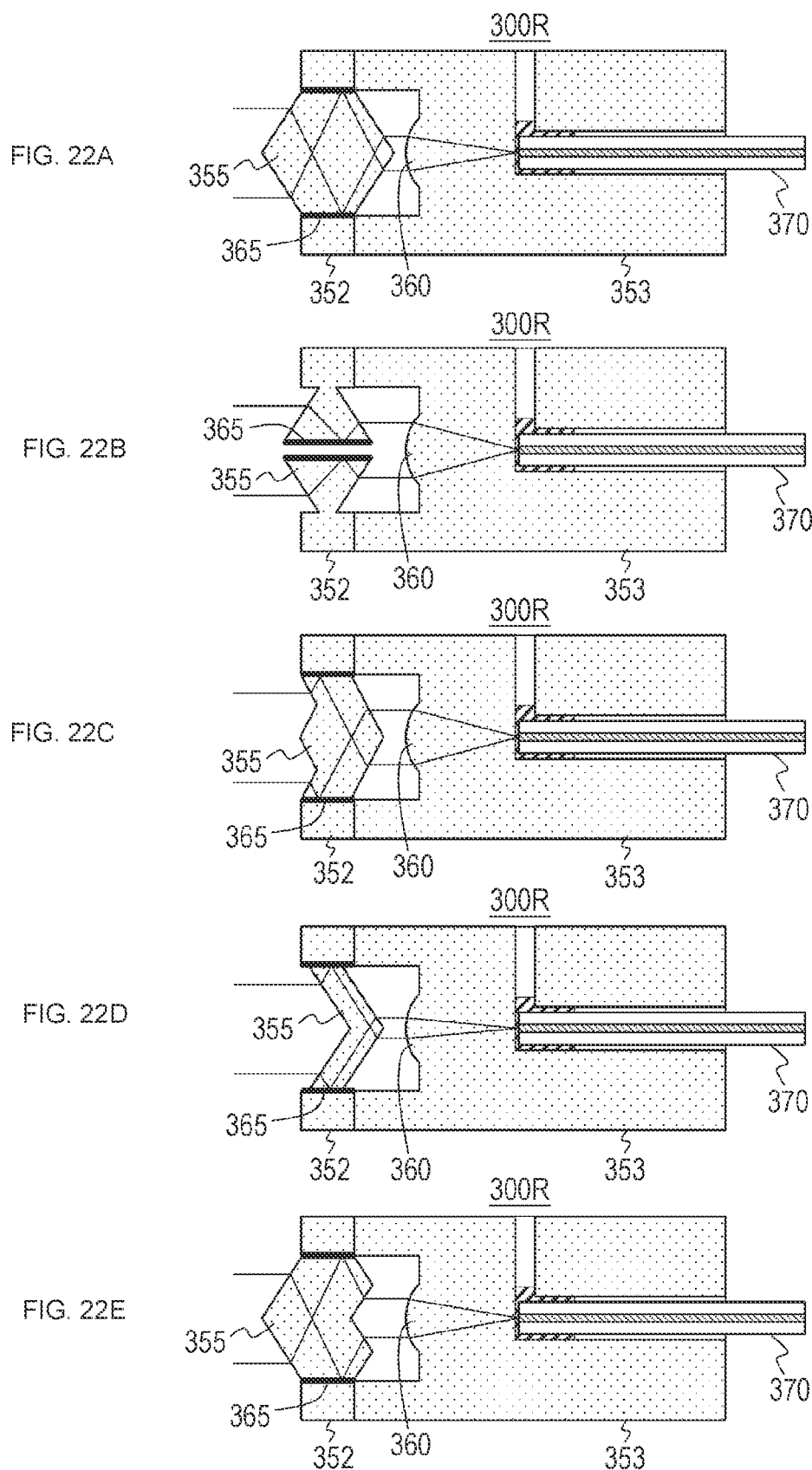

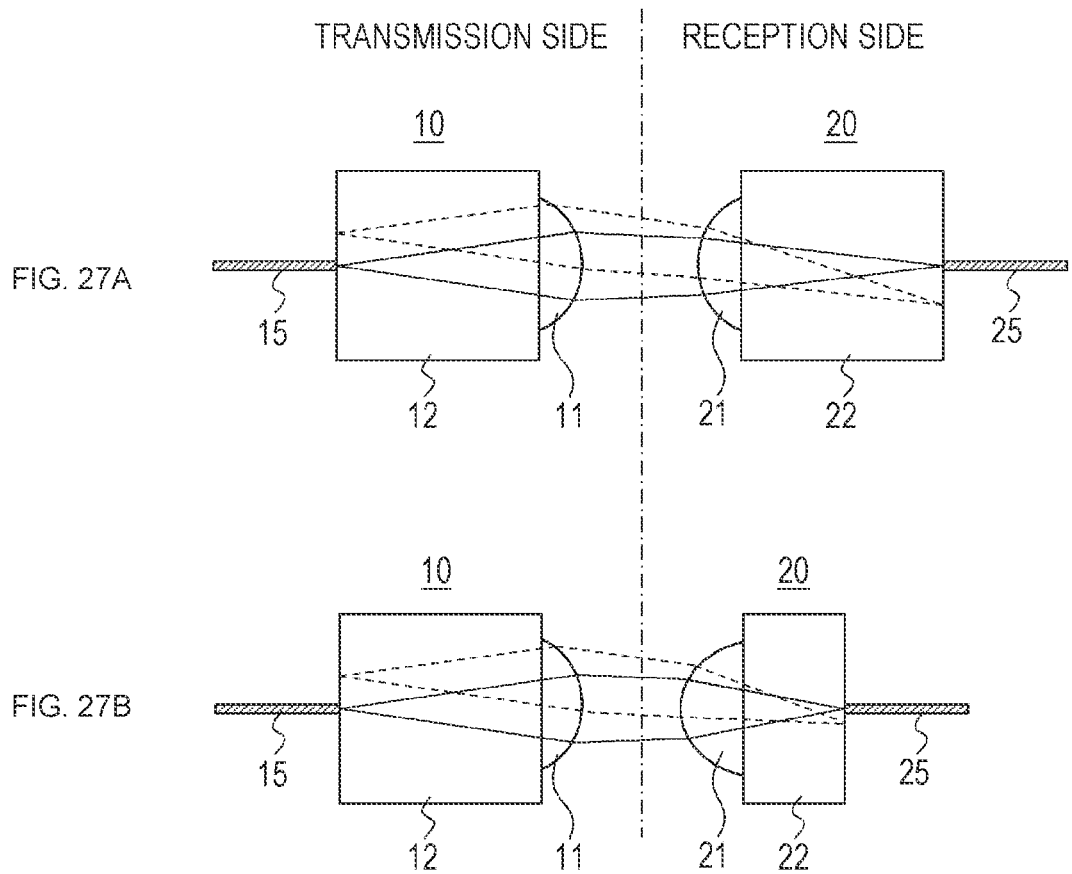

OPTICAL CONNECTOR, OPTICAL CABLE, AND ELECTRONIC DEVICE

CROSS REFERENCE TO RELATED APPLICATIONS

This application is a U.S. National Phase of International Patent Application No. PCT/JP2019/045593 filed on Nov. 21, 2019, which claims priority benefit of Japanese Patent Application No. JP 2018-233319 filed in the Japan Patent Office on Dec. 13, 2018. Each of the above-referenced applications is hereby incorporated herein by reference in its entirety.

TECHNICAL FIELD

The present technology relates to an optical connector, an optical cable, and an electronic device. Specifically, the present technology relates to, for example, an optical connector capable of mitigating optical power loss due to axis deviation.

BACKGROUND ART

Conventionally, an optical connector of optical coupling type, a so-called optical coupling connector has been proposed (e.g., see Patent Document 1). In a method of an optical coupling connector, a lens is mounted on the tip of each optical fiber in accordance with an optical axis, and an optical signal is transmitted between facing lenses as parallel light. In the optical coupling connector, optical fibers are optically coupled in a non-contact state, which inhibits adverse effects on transmission quality due to, for example, trash entering the space between the optical fibers, and eliminates the need for frequent and careful cleaning.

CITATION LIST

Patent Document

Patent Document 1: WO 2017/056889

SUMMARY OF THE INVENTION

Problems to be Solved by the Invention

An optical connector of optical coupling type has a disadvantage that, for example, in a case where an optical fiber has an exceedingly small core diameter in a single mode, deviation of a lens optical axis and an optical-fiber optical path on a transmission side, that is, axis deviation leads to significant coupling loss of optical power on a reception side.

An object of the present technology is to satisfactorily mitigate the coupling loss of optical power on the reception side due to an axis deviation on the transmission side.

Solutions to Problems

A concept of the present technology relates to
an optical connector including
a connector body including: an optical path adjusting unit that adjusts an optical path such that a diameter of incident light is reduced while an incident angle is kept; and a lens that collects light whose optical path has been adjusted by the optical path adjusting unit, and causes the light to be incident on a light receiver.

In the present technology, the connector body including the optical path adjusting unit and the lens is provided. Here, the optical path adjusting unit adjusts an optical path such that the diameter of incident light is reduced while the incident angle is kept. Furthermore, the lens collects light whose optical path has been adjusted by the optical path adjusting unit, and causes the light to be incident on the light receiver. For example, light incident on the optical path adjusting unit may be collimated light.

As described above, in the present technology, an optical path is adjusted such that such that the diameter of incident light is reduced while an incident angle is kept by the optical path adjusting unit, and a lens collects light whose optical path has been adjusted, and causes the light to be incident on a light receiver. Therefore, while the incident angle of light to the light receiver satisfies an NA, the focal distance of the lens is decreased. This can mitigate the coupling loss of optical power on the reception side due to an axis deviation on the transmission side.

Note that, in the present technology, for example, the optical path adjusting unit may have a through hole in a central portion. In this case, light in the central portion is originally within the diameter of light obtained by the optical path adjusting unit adjusting an optical path, and thus adjustment of an optical path is unnecessary. Such configuration in which the optical path adjusting unit has a through hole in the central portion can prevent the adjustment of an optical path for light in the central portion, and reduce an amount of light to be repelled and lost by the adjustment of an optical path.

Furthermore, in the present technology, for example, the optical path adjusting unit may include the optical path changing unit. The optical path adjusting unit including the optical path changing unit as described above can efficiently adjust an optical path, and reduce an amount of light to be lost.

Furthermore, in the present technology, for example, the connector body may include a first optical unit including the optical path adjusting unit and a second optical unit including a lens. The connector body including the first and second optical units as described above can facilitate, for example, manufacturing of the optical path adjusting unit and the lens.

Furthermore, in the present technology, for example, the light receiver may be an optical fiber, and the connector body may have an insertion hole into which an optical fiber is inserted. Such a connector body having an insertion hole into which an optical fiber serving as a light receiver is inserted can facilitate optical-axis alignment of the optical fiber and the lens.

In this case, for example, the connector body may include an optical path changing unit that changes an optical path at a bottom portion of the insertion hole, and light collected by the lens may be incident on the optical fiber after the optical path is changed by the optical path changing unit. The optical path changing unit provided in such a way can increase the degree of freedom in design. Then, in this case, a ferrule into which the optical fiber is inserted and fixed may be inserted into the insertion hole. This facilitates keeping a certain distance between the optical fiber and the optical path changing unit in the optical-axis direction.

Furthermore, in the present technology, for example, the light receiver may be a light receiving element that converts an optical signal into an electric signal. Forming a light receiver as a light receiving element in such a way eliminates the need for an optical fiber at the time when transmitted light is incident on the light receiving element, which can reduce costs.

In this case, for example, the light receiving element may be connected to the connector body, and light collected by the lens may be incident on the light receiving element without change of an optical path. Furthermore, for example, the connector body may include an optical path changing unit that changes an optical path, the light receiving element may be fixed on a substrate, and light collected by the lens may be incident on the light receiving element after the optical path is changed by the optical path changing unit. Such configuration in which light collected by the lens is incident on the light receiving element fixed on the substrate after the optical path is changed by the optical path changing unit facilitates mounting, and can increase the degree of freedom in design.

Furthermore, in the present technology, for example, the connector body may include a light-transmitting material, and may integrally have the optical path adjusting unit and the lens. In this case, the precision of the positions of the optical path adjusting unit and the lens with respect to the connector body can be increased.

Furthermore, in the present technology, for example, the connector body may include a plurality of combinations of the optical path adjusting unit and the lens. Such configuration in which the connector body includes a plurality of combinations of the optical path adjusting unit and the lens can facilitate the increase in the number of channels.

Furthermore, in the present technology, for example, the connector body may include a recessed light incident portion, and the optical path adjusting unit may be positioned at the bottom portion of the light incident portion. The optical path adjusting unit positioned at the bottom portion of the light incident portion as described above can prevent the surface of the optical path adjusting unit from being scratched by carelessly hitting against, for example, a connector on the other side.

Furthermore, in the present technology, for example, the connector body may integrally include, on a front surface side, a projecting or recessed position restricting portion that is used for position alignment with a connector on a side to be connected. This facilitates optical-axis alignment at the time of connection with the connector on the other side.

Furthermore, in the present technology, for example, a light receiver may be further provided. Such configuration with a light receiver can save the trouble of mounting the light receiver.

Furthermore, another concept of the present technology relates to an optical cable including an optical connector serving as a plug, in which the optical connector includes a connector body including: an optical path adjusting unit that adjusts an optical path such that a diameter of incident light is reduced while an incident angle is kept; and a lens that collects light whose optical path has been adjusted by the optical path adjusting unit, and causes the light to be incident on a light receiver.

Furthermore, another concept of the present technology relates to an electronic device including an optical connector serving as a receptacle, in which the optical connector includes a connector body including: an optical path adjusting unit that adjusts an optical path such that a diameter of incident light is reduced while an incident angle is kept; and a lens that collects light whose optical path has been adjusted by the optical path adjusting unit, and causes the light to be incident on a light receiver.

BRIEF DESCRIPTION OF DRAWINGS

FIGS. 5A and 5B illustrate a disadvantage in the method using two lenses.

FIGS. 20A, 20B, 20C, 20D, and 20E illustrate a variation (not including a mirror) of the optical path adjusting unit.

FIGS. 21A, 21B, 21C, 21D, and 21E illustrate a variation (including a mirror) of the optical path adjusting unit.

FIGS. 22A, 22B, 22C, 22D, and 22E illustrate a variation (including a mirror) of the optical path adjusting unit.

FIGS. 27A and 27B illustrate occurrence of the coupling loss of optical power due to an optical-axis deviation in an optical coupling connector using convergent light (light bent in a light collecting direction) and a method of reducing the coupling loss.

MODE FOR CARRYING OUT THE INVENTION

An embodiment for carrying out the invention (hereinafter referred to as an "embodiment") will be described below. Note that the description will be given in the following order.
1. Embodiment
2. Variations 1. Embodiment

Figure 1:
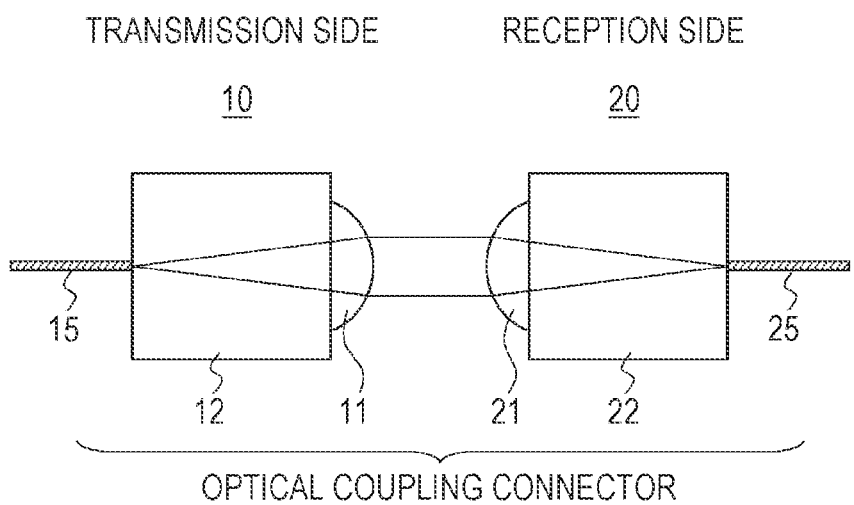
FIG. 1 outlines an optical coupling connector.

[Basic Description of Present Technology]
First, technology related to the present technology will be described. FIG. 1 outlines an optical connector of optical coupling type (hereinafter, referred to as an "optical coupling connector"). The optical coupling connector includes a transmission side optical connector 10 and a reception side optical connector 20.

The transmission side optical connector 10 includes a connector body 12 having a lens 11. The reception side optical connector 20 includes a connector body 22 having a lens 21. In a case where the transmission side optical connector 10 and the reception side optical connector 20 are connected, the lens 11 and the lens 21 face each other, and optical axes thereof match each other, as illustrated in the figure.

An optical fiber 15 is attached to the connector body 12 on the transmission side such that the emission end of the optical fiber 15 is located at the focal position on an optical axis of the lens 11. Furthermore, an optical fiber 25 is attached to the connector body 22 on the reception side such that the incident end of the optical fiber 25 is located at the focal position on an optical axis of the lens 21.

Light emitted from the optical fiber 15 on the transmission side is incident on the lens 11 via the connector body 12, and light that has been shaped into collimated light is emitted from the lens 11. The light that has been shaped into collimated light in such a way is incident on the lens 21 and collected, and then is incident on the incident end of the optical fiber 25 on the reception side via the connector body 22. As a result, light (optical signal) is transmitted from the optical fiber 15 on the transmission side to the optical fiber 25 on the reception side.

In an optical coupling connector as illustrated in FIG. 1, in a case where an optical fiber has an exceedingly small core diameter of approximately 8 μmφ in a single mode, deviation of an optical-fiber optical path (optical-axis deviation) from a lens optical axis on the transmission side significantly influences the coupling loss of optical power on the reception side. As a result, in a case of the optical coupling connector, high parts precision is required in order to inhibit the axis deviation on the transmission side, which increases costs.

Decreasing the focal distance of the lens 21 on the reception side and decreasing the distance from the lens 21 to a light collecting point, that is, an incident end of the optical fiber 25 on the reception side can be considered as a method of reducing the coupling loss of optical power on the reception side due to an optical-axis deviation on the transmission side.

Figure 2A:
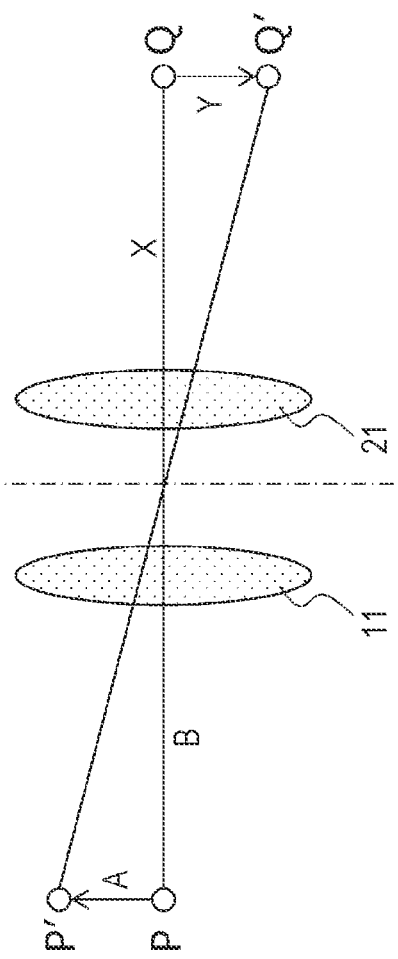
FIGS. 2A and 2B illustrate a method of reducing the coupling loss of optical power on a reception side due to an optical-axis deviation on a transmission side.

The case where light is transmitted from a light source P on the transmission side to a light collecting point Q on the reception side will be described. FIG. 2A illustrates a state in which the distance from the lens 21 to the light collecting point Q is not decreased on the reception side. In this case, if the position of the light source P on the transmission side is deviated to P' by A, the position of the light collecting point Q on the reception side is deviated to Q' by Y.

Figure 2B:
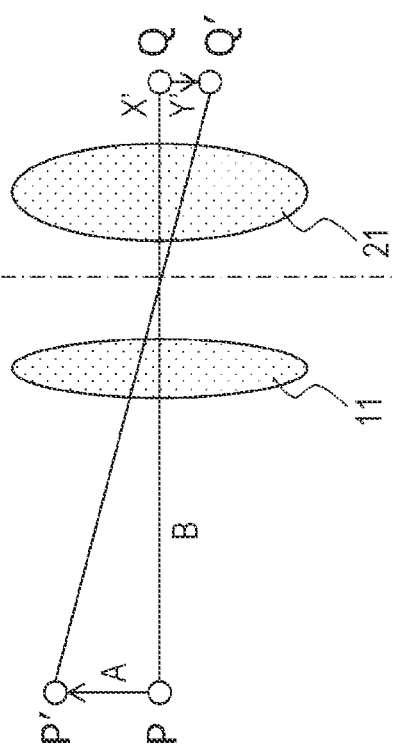

FIG. 2B illustrates a state in which the curvature of the lens 21 is increased to decrease the focal distance, and the distance from the lens 21 to the light collecting point Q is decreased on the reception side. In this case, if the position of the light source P on the transmission side is deviated to P' by A, the position of the light collecting point Q on the reception side is deviated to Q' by Y', and Y' is smaller than Y.

Expression (1) below generally represents the relation between the light source P and the light collecting point Q. Here, A represents a position deviation amount of the light source P, B represents the distance from the light source P to the lens 11, X represents the distance from a lens 12 to the light collecting point Q, and Y represents a position deviation amount of the light collecting point Q. Expression (1) indicates that, if A is constant, Y can be reduced by decreasing X. For example, if X is decreased to X', Y is decreased to Y'.

$$Y/A = X/B \tag{1}$$

Figure 3A:
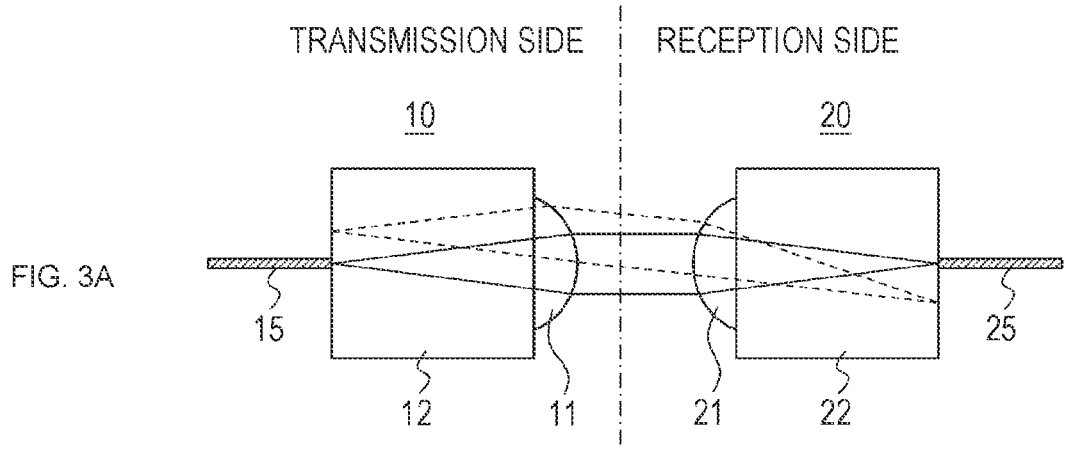
FIGS. 3A and 3B illustrate occurrence of the coupling loss of optical power due to an optical-axis deviation in an optical coupling connector using collimated light and a method of reducing the coupling loss.

The theory described in FIGS. 2A and 2B will be considered with reference to an optical coupling connector using collimated light. As illustrated in FIG. 3A, in a case where light emitted from the optical fiber 15 on the transmission side is used as a light source, the deviation of the position of the light source significantly deviates a light collecting point on the reception side (see broken lines). This is because light to be collimated by the lens 11 is thrown into disorder, so that the light is not parallel to the optical axis and is obliquely input to the lens 21 on the reception side, which deviates the light collecting point.

Figure 3B:
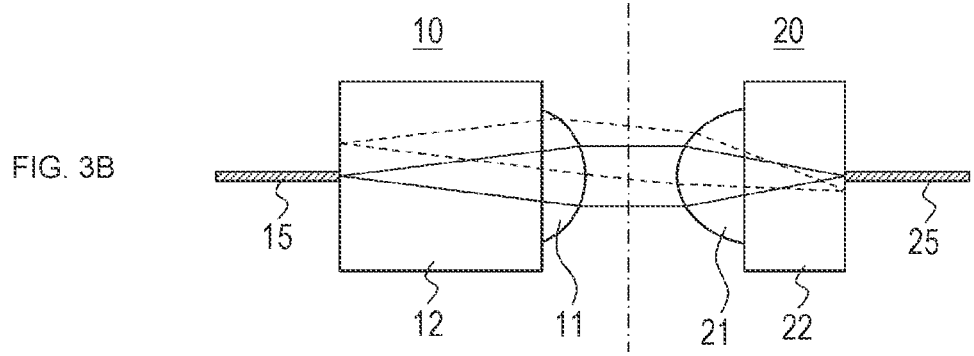

As illustrated in FIG. 3B, however, in a case where the distance between the lens 21 and the optical fiber 25 on the reception side is short, a deviation amount of the light collecting point is decreased as compared to the case of FIG. 3A even if the position of the light source is deviated (see broken lines). In this case, the curvature of the lens 21 on the reception side in FIG. 3B is larger than that in FIG. 3A. The incident angle of light incident from the lens 21 on the reception side to the incident end of the optical fiber 25 in FIG. 3B is steeper than that in FIG. 3A.

If the distance between the lens 21 and the optical fiber 25 on the reception side is decreased as illustrated in FIG. 3B, the position deviation of the light collecting point on the reception side due to the position deviation of the light source on the transmission side can be reduced. If the collimating diameter is constant, however, the incident angle with respect to the optical fiber 25 is increased. At this time, light incident at an incident angle equal to or greater than the NA of the optical fiber 25 cannot be transmitted into the optical fiber 25, and lost. Consequently, if the distance between the lens 21 and the optical fiber 25 on the reception side is excessively decreased, the coupling loss of optical power is increased.

Figure 4A:
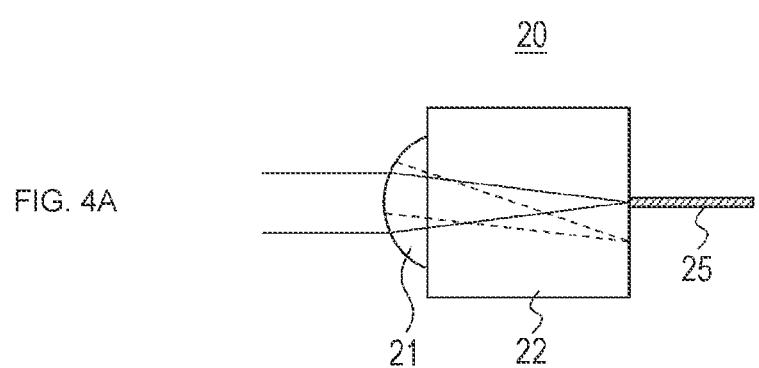
FIGS. 4A and 4B illustrate a method of controlling the incident angle of incident light on an optical fiber by using two lenses.
Figure 4B:
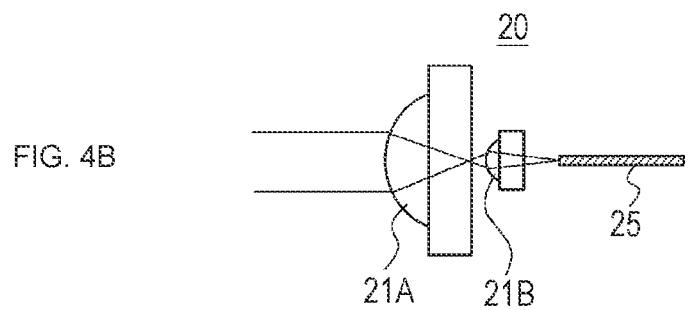

Thus, as illustrated in FIG. 4B, a method of controlling an incident angle of light incident on the optical fiber 25 by using two lenses of a first lens 21A and a second lens 21B can be considered. In this method, the distance from the first lens 21A to the optical fiber 25 is decreased by collecting collimated light at an angle equal to greater than the NA of the optical fiber 25 with the first lens 21A, converting the incident angle into an angle that satisfies the NA of the optical fiber 25 with the second lens 21B, and causing the light to be incident on the optical fiber 25. Note that FIG. 4A illustrates a reception side similar to the reception side in FIG. 3A.

The method using two lenses as illustrated in FIG. 4B, however, has a disadvantage. FIG. 5A is the same as FIG. 4B. FIG. 5B is an enlarged view of FIG. 5A. Focusing on the second lens 21B, a distance X on an emission side is larger than a distance B on an incident side since the second lens 21B is installed for making an emission angle of incident light narrower than an incident angle of incident light.

As a result, as illustrated in Expression (1) above, a position variation amount Y of the light collecting point is larger than a position variation amount A on the light source side. Thus, even if the distance from the first lens 21A to the optical fiber 25 can be decreased, the position variation amount of the light collecting point remains large, and the effect of using two lenses is small.

Figure 6A:
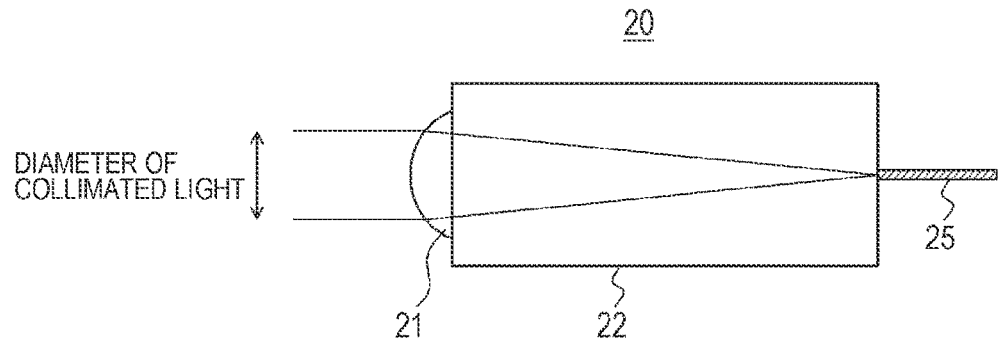
FIGS. 6A and 6B illustrate a method of decreasing the distance between a lens and an optical fiber while satisfying an NA of the optical fiber.
Figure 6B:
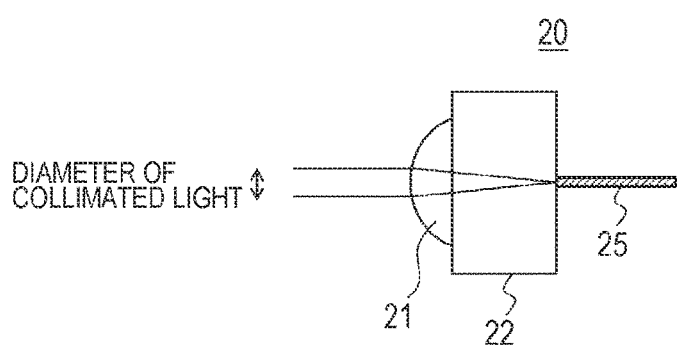

A method of reducing the diameter of collimated light incident from the transmission side optical connector as illustrated in FIGS. 6A and 6B can be considered as a method of reducing the distance between a lens and an optical fiber while satisfying the NA of the optical fiber. In this case, in a case where dust such as dirt and mote is mixed in collimated light, a small diameter of the collimated light increases the influence of dust, which makes it harder to keep communication quality. A larger diameter of the collimated light makes it easier to keep communication power even if dust is mixed. Consequently, collimated light desirably has a certain degree of size of diameter in optical communication. In that case, however, the distance between the lens 21 and the optical fiber 25 is increased to satisfy the NA, which makes it harder to reduce the deviation amount of the light collecting point due to an optical-axis deviation.

Figure 7:
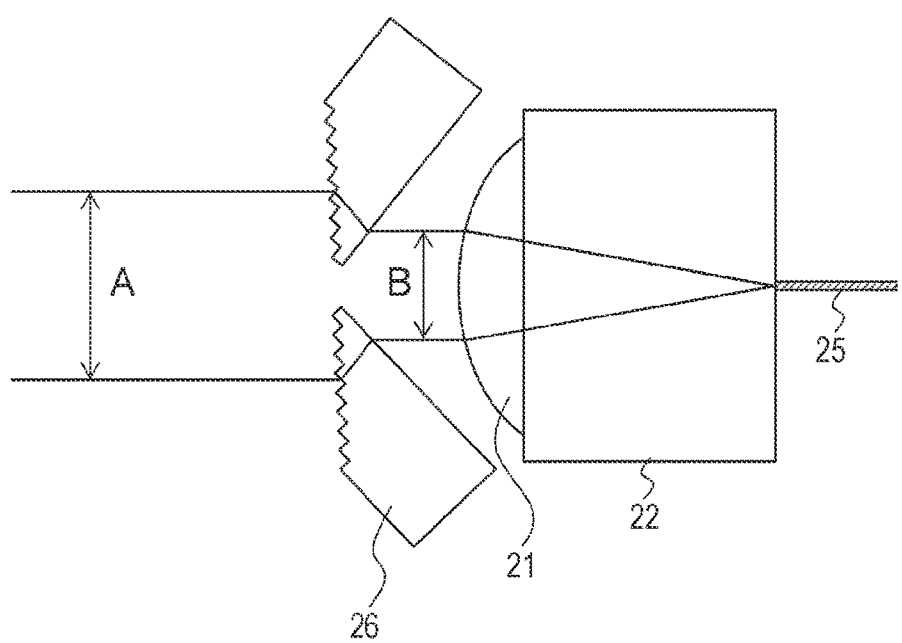
FIG. 7 illustrates the principle configuration of a reception side optical connector in the present technology.

FIG. 7 illustrates the principle configuration of the reception side optical connector 300R in the present technology. An optical path adjusting unit 26 is placed on the front surface side of the lens 21 in the reception side optical connector 300R. The optical path adjusting unit 26 adjusts an optical path such that the diameter of incident light is reduced while the incident angle is kept. In this case, light on the outer peripheral side of the incident light is translated to the inner peripheral side by the optical path adjusting unit 26, which results in a reduced diameter.

Figure 8:
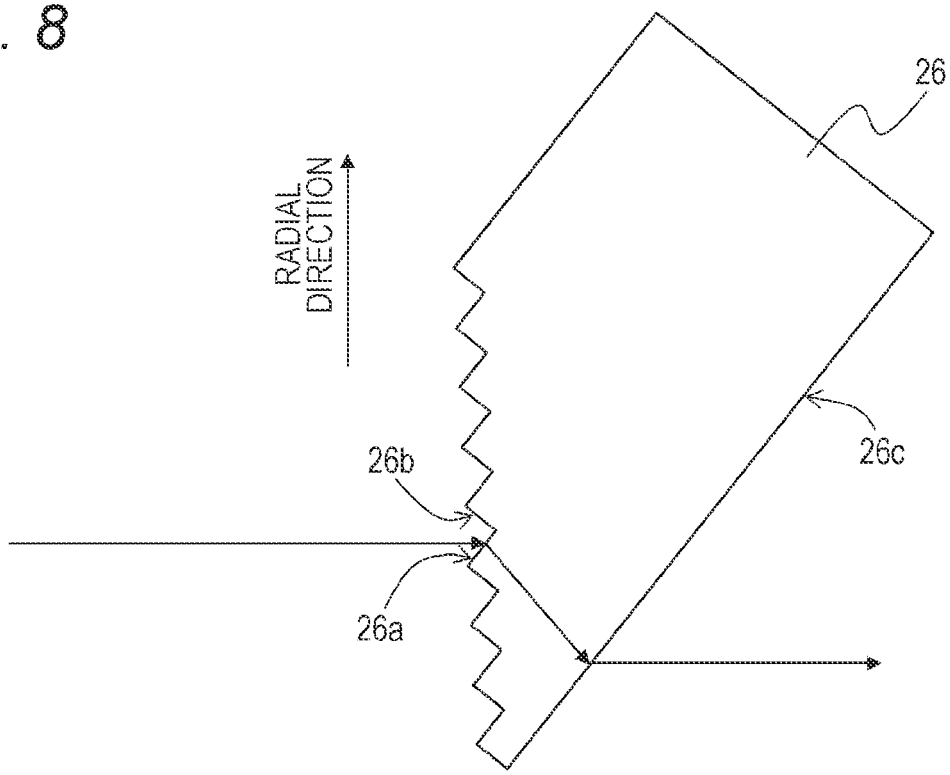
FIG. 8 illustrates the function of an optical path adjusting unit.

FIG. 8 illustrates the enlarged optical path adjusting unit 26. In this case, a first surface 26a and a second surface 26b are radially and alternately placed in a stepped shape on an incident surface. The first surface 26a is parallel to an emission surface 26c. Therefore, the light incident on the first surface 26a is translated to the inner peripheral side through the illustrated path, and emitted.

As illustrated in FIG. 7, the diameter of input collimated light is A, but the optical path adjusting unit 26 adjusts the optical path to cause the collimated light incident on the lens 21 to have a diameter of B (<A). The incident angle to the optical fiber 25 of light after transmitting through the lens 21 can be narrowed. Therefore, the distance between the lens 21 and the optical fiber 25 can be decreased by increasing the curvature of the lens 21 while satisfying the NA. The deviation of the light collecting point on the reception side due to an optical-axis deviation on the transmission side is reduced to satisfactorily mitigate the coupling loss of optical power.

In this case, the diameter is narrowed at the stage of collimated light. As a result, the distance between the lens and the optical fiber can be decreased without using two lenses as illustrated in FIG. 4B, and the diameter of collimated light input to the connector can be kept large, which leads to a configuration having resistance to dust.

[Configuration Example of Electronic Device and Optical Cable]

Figure 9:
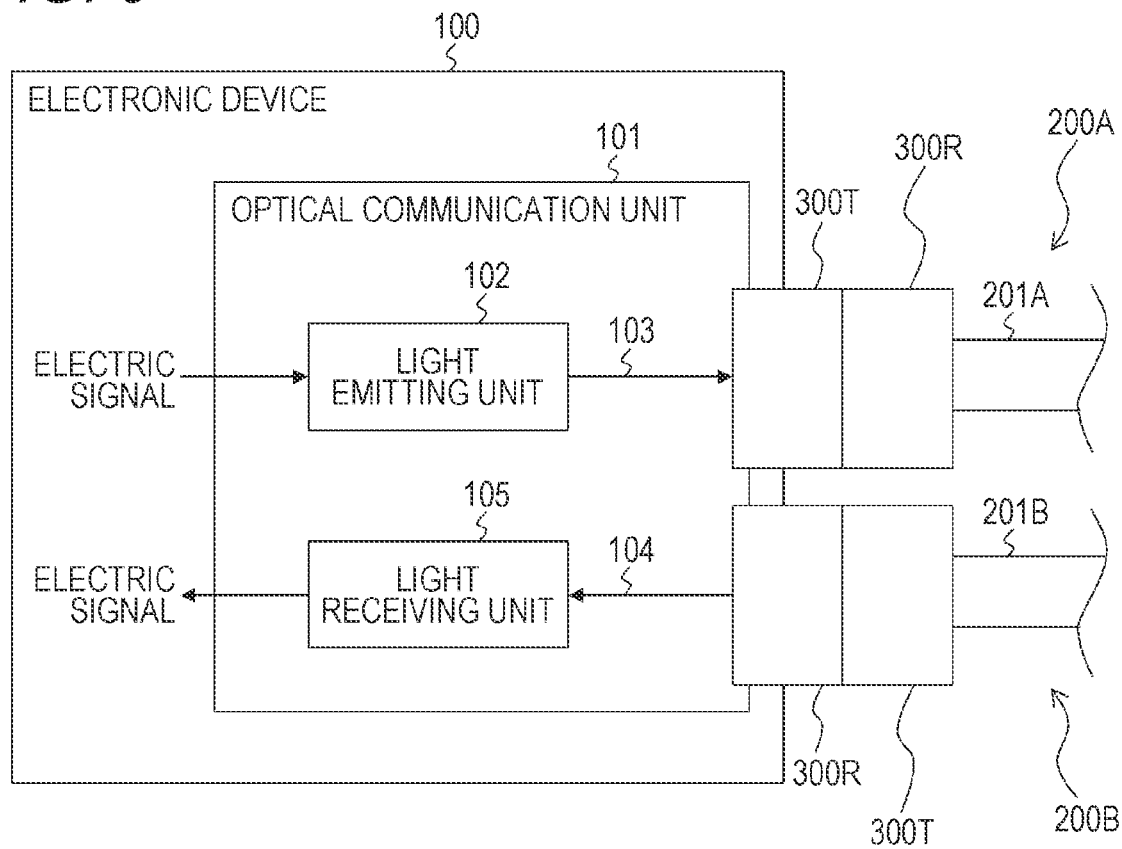
FIG. 9 illustrates a configuration example of an electronic device and optical cables as an embodiment.

FIG. 9 illustrates a configuration example of an electronic device 100 and optical cables 200A and 200B as an embodiment. The electronic device 100 includes an optical communication unit 101. The optical communication unit 101 includes a light emitting unit 102, an optical transmission line 103, a transmission side optical connector 300T serving as a receptacle, a reception side optical connector 300R serving as a receptacle, an optical transmission line 104, and a light receiving unit 105. Each of the optical transmission lines 103 and 104 can be implemented by an optical fiber.

The light emitting unit 102 includes a laser element such as a vertical cavity surface emitting laser (VCSEL) or a light emitting element such as a light emitting diode (LED). The light emitting unit 102 converts an electric signal (transmission signal) generated in a transmission circuit (not illustrated) of the electronic device 100 into an optical signal. The optical signal emitted by the light emitting unit 102 is sent to the transmission side optical connector 300T via the optical transmission line 103. Here, the light emitting unit 102, the optical transmission line 103, and the transmission side optical connector 300T constitute an optical transmitter.

An optical signal received by the reception side optical connector 300R is sent to the light receiving unit 105 via the optical transmission line 104. The light receiving unit 105 includes a light receiving element such as a photodiode. The light receiving unit 105 converts an optical signal sent from the reception side optical connector 300R into an electric signal (reception signal), and supplies the converted signal to a reception circuit (not illustrated) of the electronic device 100. Here, the reception side optical connector 300R, the optical transmission line 104, and the light receiving unit 105 constitute an optical receiver.

The optical cable 200A includes the reception side optical connector 300R serving as a plug and a cable body 201A. The optical cable 200A transmits an optical signal from the electronic device 100 to another electronic device. The cable body 201A can be implemented by an optical fiber.

One end of the optical cable 200A is connected to the transmission side optical connector 300T of the electronic device 100 by the reception side optical connector 300R, and the other end of the optical cable 200A is connected to another electronic device (not illustrated). In this case, the transmission side optical connector 300T and the reception side optical connector 300R, which are connected to each other, constitute an optical coupling connector.

The optical cable 200B includes the transmission side optical connector 300T serving as a plug and a cable body 201B. The optical cable 200B transmits an optical signal from another electronic device to the electronic device 100. The cable body 201B can be implemented by an optical fiber.

One end of the optical cable 200B is connected to the reception side optical connector 300R of the electronic device 100 by the transmission side optical connector 300T, and the other end of the optical cable 200B is connected to another electronic device (not illustrated). In this case, the transmission side optical connector 300T and the reception side optical connector 300R, which are connected to each other, constitute an optical coupling connector.

Note that the electronic device 100 may be, for example, a mobile electronic device, such as a mobile phone, a smartphone, a PHS, a PDA, a tablet PC, a laptop computer, a video camera, an IC recorder, a portable media player, an electronic notebook, an electronic dictionary, a calculator, and a portable game machine, or another electronic device such as a desktop computer, a display apparatus, a TV receiver, a radio receiver, a video recorder, a printer, a car navigation system, a game machine, a router, a hub, and an optical network unit (ONU) Alternatively, the electronic device 100 can constitute a part or all of an electric product, such as a refrigerator, a washing machine, a clock, an interphone, an air conditioner, a humidifier, an air purifier, a lighting device, and a cooking device, and a vehicle as described later.

[Configuration Example of Optical Connector]

Figure 10:
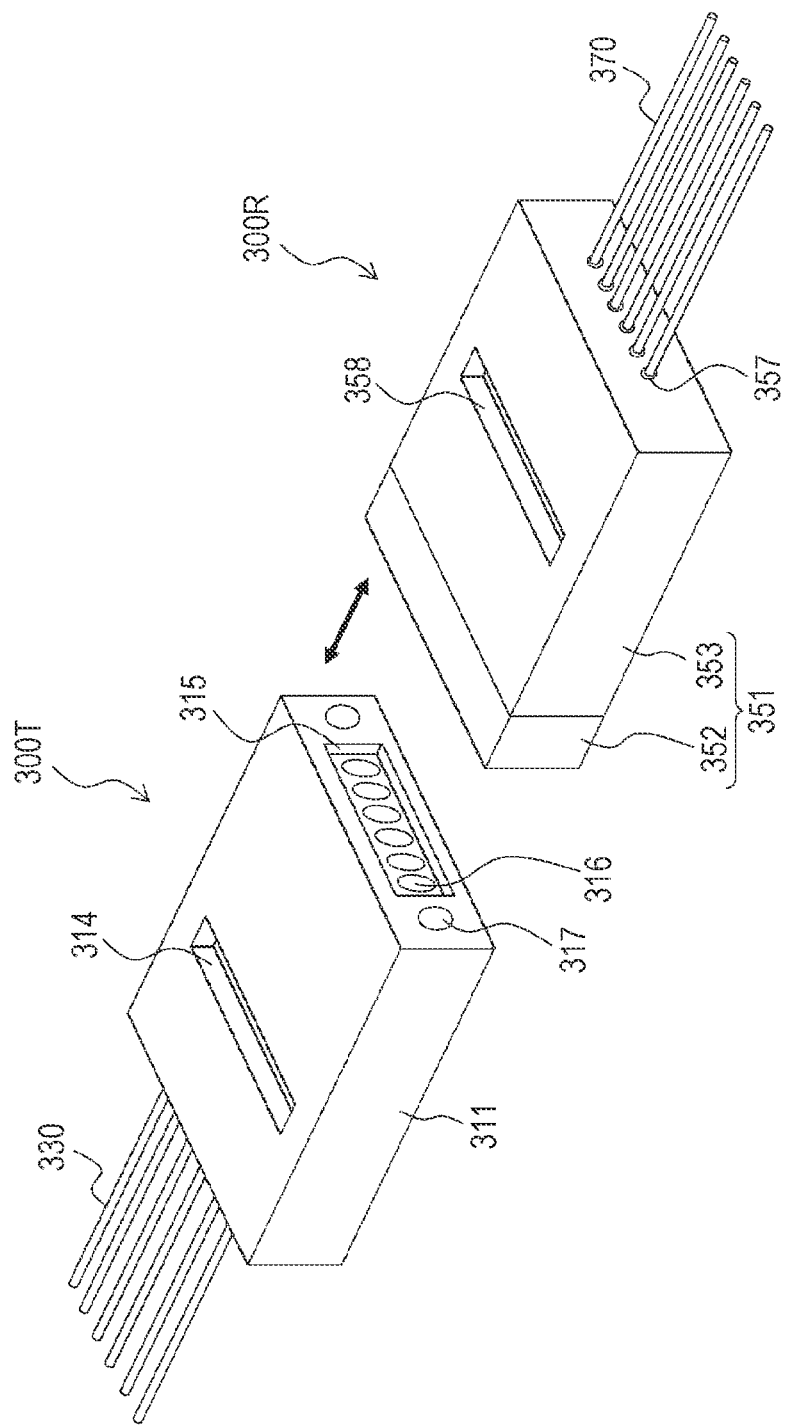
FIG. 10 is a perspective view illustrating one example of a transmission side optical connector and a reception side optical connector, which constitute an optical coupling connector.
Figure 11:
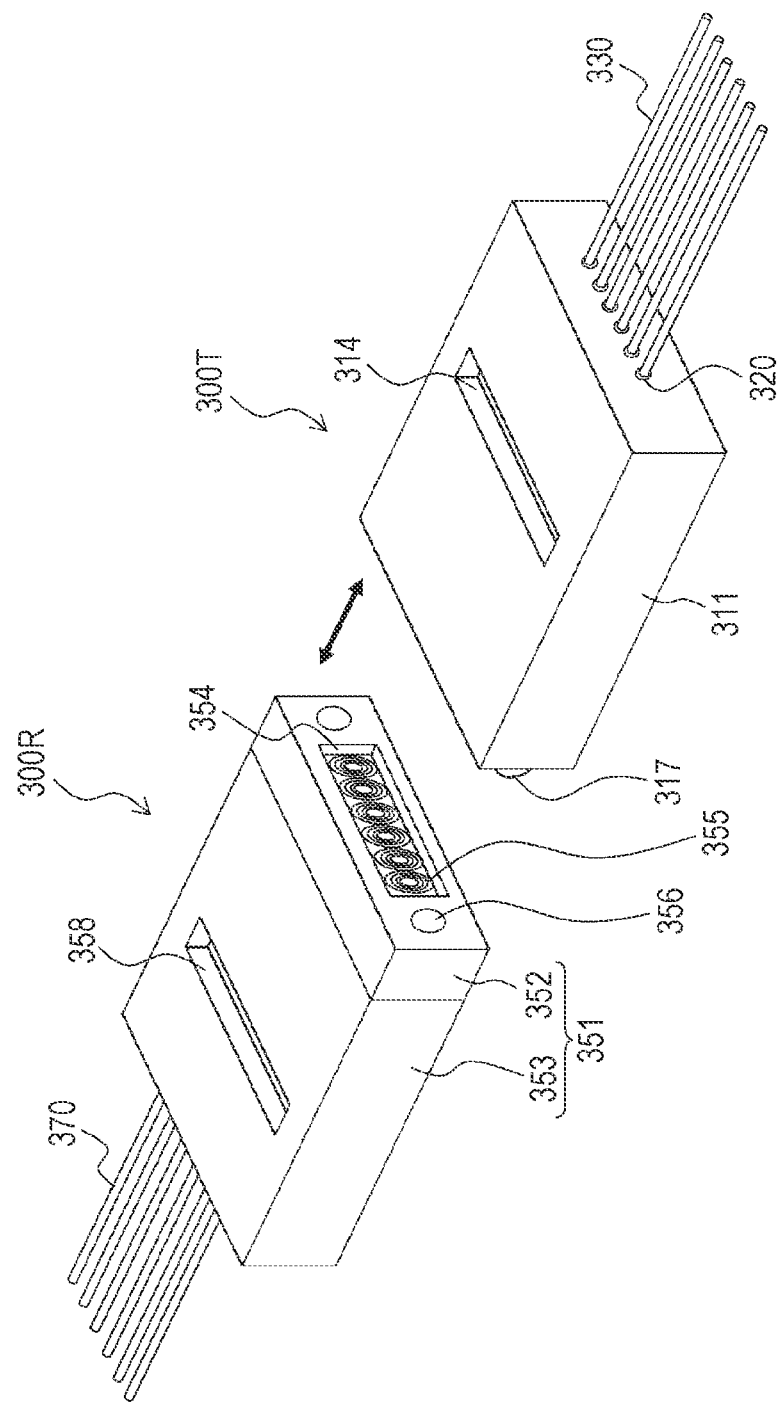
FIG. 11 is a perspective view illustrating one example of the transmission side optical connector and the reception side optical connector, which constitute the optical coupling connector.

FIG. 10 is a perspective view illustrating one example of the transmission side optical connector 300T and the reception side optical connector 300R, which constitute an optical coupling connector. FIG. 11 is also a perspective view illustrating one example of the transmission side optical connector 300T and the reception side optical connector 300R, but is seen from the direction opposite to that of FIG. 10. The examples illustrate a parallel transmission of optical signals through a plurality of channels. Note that, although the parallel transmission of optical signals through a plurality of channels is illustrated here, transmission of an optical signal through one channel can be performed. The detailed description is omitted.

The transmission side optical connector 300T includes a connector body 311 having a substantially rectangular parallelepiped appearance. A plurality of optical fibers 330 corresponding to individual channels is connected to the back surface side of the connector body 311 in a horizontally aligned state. In this case, each optical fiber 330 is fixed with the tip side thereof being inserted into an optical fiber insertion hole 320. Here, the optical fiber 330 constitutes a light emitter. Furthermore, an adhesive injection hole 314 having a rectangular opening is formed on the upper surface side of the connector body 311. An adhesive for fixing the optical fiber 330 to the connector body 311 is inserted through the adhesive injection hole 314.

Furthermore, a recessed light emitting portion (light transmission space) 315 having a rectangular opening is formed on the front surface side of the connector body 311. A plurality of lenses (convex lens) 316 corresponding to individual channels is formed in a horizontally aligned state at a bottom portion of the light emitting portion 315. This configuration prevents the surface of the lens 316 from being scratched by carelessly hitting against, for example, a connector on the other side.

Furthermore, a projecting or recessed (projecting in the illustrated example) position restricting portion 317 for performing positioning with the reception side optical connector 300R is integrally formed on the front surface side of the connector body 311. This configuration facilitates optical-axis alignment at the time of connection with the reception side optical connector 300R. Note that the position restricting portion 317 is not limited to being integrally formed with the connector body 311. The position restricting portion 317 may be formed with a pin or by another approach.

The reception side optical connector 300R includes a connector body 351 having a substantially rectangular parallelepiped appearance. The connector body 351 is configured by connecting a first optical unit 352 and a second optical unit 353. The connector body 351 configured by the first and second optical units 352 and 353 as described above can facilitate, for example, manufacturing of a lens of the connector body 351 (not illustrated in FIGS. 10 and 11).

A recessed light incident portion (light transmission space) 354 having a rectangular opening is formed on the front surface side of the first optical unit 352. A plurality of optical path adjusting units 355 corresponding to individual channels is formed in a horizontally aligned state at a bottom portion of the light incident portion 354. This configuration prevents the surface of the optical path adjusting units 355 from being scratched by carelessly hitting against, for example, a connector on the other side.

Furthermore, a projecting or recessed (recessed in the illustrated example) position restricting portion 356 for performing positioning with the transmission side optical connector 300T is integrally formed on the front surface side of the first optical unit 352. This configuration facilitates optical-axis alignment at the time of connection with the transmission side optical connector 300T. Note that the position restricting portion 356 is not limited to being integrally formed with the first optical unit 352. The position restricting portion 356 may be formed with a pin or by another approach.

A plurality of optical fibers 370 corresponding to individual channels is connected to the back surface side of the second optical unit 353 in a horizontally aligned state. In this case, each optical fiber 370 is fixed with the tip side thereof being inserted into an optical fiber insertion hole 357. Here, the optical fiber 370 constitutes a light receiver. Furthermore, an adhesive injection hole 358 having a rectangular opening is formed on the upper surface side of the second optical unit 353. An adhesive for fixing the optical fiber 370 to the second optical unit 353 is inserted through the adhesive injection hole 358.

Figure 12:
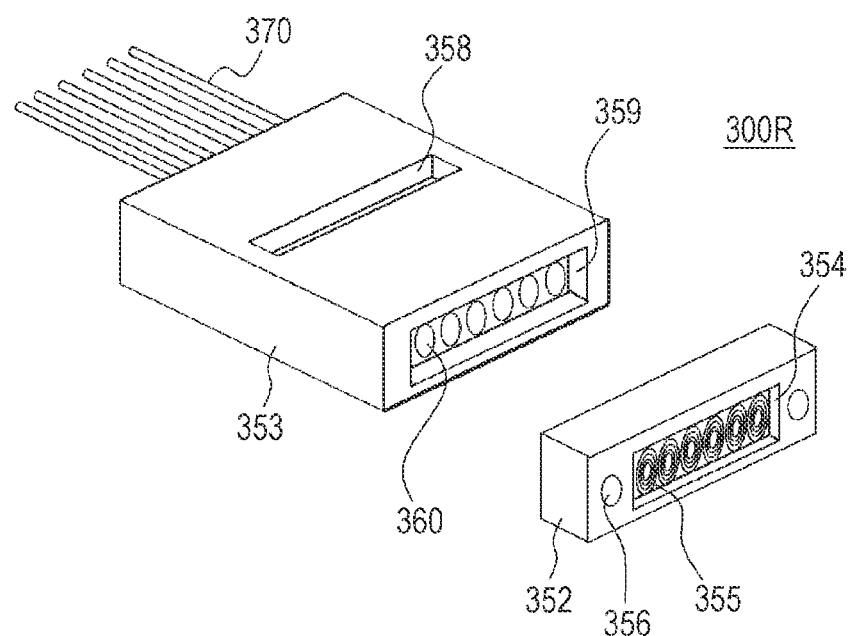
FIG. 12 is a perspective view illustrating a state in which a first optical unit and a second optical unit, which constitute a connector body, are separated.
Figure 13:
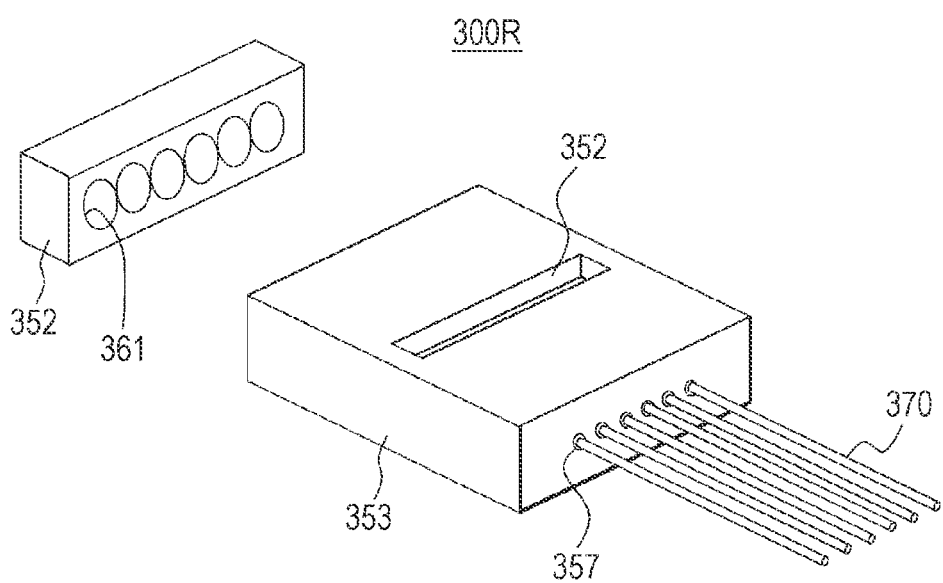
FIG. 13 is a perspective view illustrating a state in which the first optical unit and the second optical unit, which constitute the connector body, are separated.

FIGS. 12 and 13 are perspective views illustrating a state in which the first optical unit 352 and the second optical unit 353, which constitute the connector body 351, are separated. FIGS. 7 and 8 are seen from opposite directions. Recessed space 359 having a rectangular opening is formed on the front surface side of the second optical unit 353. A plurality of lenses 360 corresponding to individual channels is formed in a horizontally aligned state at a bottom portion of the space 359. Furthermore, a circular opening 361 is formed on the back surface side of the first optical unit 352. Light that has transmitted through the optical path adjusting unit 355 of each channel is emitted from the opening 361.

Figure 14:
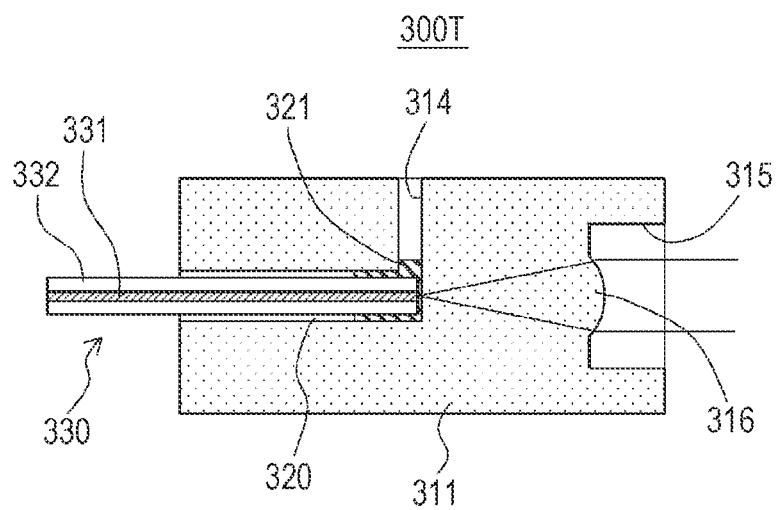
FIG. 14 is a cross-sectional view illustrating one example of the transmission side optical connector.

FIG. 14 is a cross-sectional view illustrating one example of the transmission side optical connector 300T. In the illustrated example, the description of the position restricting portion 317 (see FIGS. 10 and 11) is omitted. The transmission side optical connector 300T will be further described with reference to FIG. 14.

The transmission side optical connector 300T includes the connector body 311. The connector body 311 includes, for example, a light-transmitting material such as synthetic resin or glass, or a material such as silicon that transmits a specific wavelength, and is configured as a ferrule with a lens.

The recessed light emitting portion (light transmission space) 315 is formed on the front surface side of the connector body 311. Then, a plurality of lenses (convex lens) 316 corresponding to individual channels is integrally formed on the connector body 311 in a horizontally aligned state so as to be positioned at the bottom portion of the light emitting portion 315. This configuration can increase the precision of the position of the lens 316 with respect to the connector body 311.

Furthermore, a plurality of optical fiber insertion holes 320 extending from the back surface side to the front is provided in the connector body 311 in a horizontally aligned state in accordance with the lenses 316 of the channels. The optical fiber 330 has double structure of the core 331 in the center portion of an optical path and a clad 332 covering the periphery the core 331.

The optical fiber insertion hole 320 of each channel is shaped such that the core 331 of the optical fiber 330 to be inserted into the optical fiber insertion hole 320 and the optical axis of the corresponding lens 316 match each other. Furthermore, the optical fiber insertion hole 320 of each channel is shaped such that the bottom position of the optical fiber insertion hole 320, that is, the abutting position of the tip (incident end) of the optical fiber 330 in a case where the optical fiber 330 is inserted matches the focal position of the lens 316.

Furthermore, the adhesive injection hole 314 extending downward from the upper surface side is formed in the connector body 311 so as to communicate with the vicinity of the bottom position of a plurality of optical fiber insertion holes 320 in the horizontally aligned state. After the optical fiber 330 is inserted into the optical fiber insertion hole 320, an adhesive 321 is injected around the optical fiber 330 through the adhesive injection hole 314, whereby the optical fiber 330 is fixed to the connector body 311.

In the transmission side optical connector 300T, the lens 316 has a function of shaping incident light into collimated light. This causes light emitted from the emission end of the optical fiber 330 with a predetermined NA to be incident on the lens 316, shaped into collimated light, and then emitted.

Figure 15:
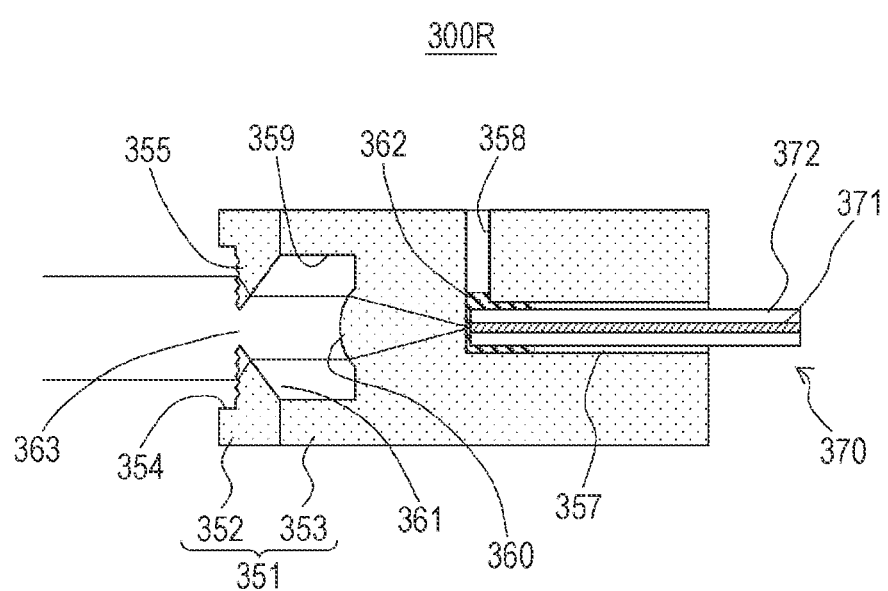
FIG. 15 is a cross-sectional view illustrating one example of the reception side optical connector.

FIG. 15 is a cross-sectional view illustrating one example of the reception side optical connector 300R. In the illustrated example, the description of the position restricting portion 356 (see FIG. 11) is omitted. The reception side optical connector 300R will be further described with reference to FIG. 15.

The reception side optical connector 300R includes the connector body 351 configured by connecting the first optical unit 352 and the second optical unit 353. The first optical unit 352 includes, for example, a light-transmitting material such as synthetic resin or glass, or a material such as silicon that transmits a specific wavelength.

The recessed light incident portion (light transmission space) 354 is formed on the front surface side of the first optical unit 352. Then, a plurality of optical path adjusting units 355 corresponding to individual channels is integrally formed on the first optical unit 352 in a horizontally aligned state so as to be positioned at the bottom portion of the light incident portion 354. This configuration can adjust the position of the optical path adjusting unit 355 with respect to the first optical unit 352 all at the same time in a plurality of channels. Furthermore, a circular opening 361 is formed on the back surface side of the first optical unit 352. Light that has transmitted through the optical path adjusting unit 355 of each channel is emitted from the opening 361.

The optical path adjusting unit 355 corresponds to the optical path adjusting unit 26 in FIG. 7 described above. The optical path adjusting unit 355 adjusts an optical path such that the diameter of incident light (collimated light) is reduced while the incident angle is kept. In this case, light on the outer peripheral side of the incident light is translated to the inner peripheral side by the optical path adjusting unit 355, which results in a reduced diameter.

Here, the illustrated optical path adjusting unit 355 has a configuration having a through hole 363 in the central portion. In this case, light in the central portion is originally within the diameter of light obtained by the optical path adjusting unit 355 adjusting an optical path, and thus adjustment of an optical path is unnecessary. Such configuration in which the optical path adjusting unit 355 has the through hole 363 in the central portion can prevent the adjustment of an optical path for light in the central portion, and reduce an amount of light to be repelled and lost by the adjustment of an optical path.

The second optical unit 353 includes, for example, a light-transmitting material such as synthetic resin or glass, or a material such as silicon that transmits a specific wavelength, and is configured as a ferrule with a lens. Such configuration of a ferrule with a lens can facilitate optical-axis alignment of the optical fiber 370 and the lens 360. Furthermore, such configuration of the second optical unit 353 as a ferrule with a lens can facilitate multi-channel communication only by inserting the optical fiber 370 into the ferrule even in a case of multiple channels.

The second optical unit 353 is connected to the first optical unit 352 to constitute the connector body 351. Since aligned thermal expansion coefficients inhibit optical-path deviation due to distortion at the two optical units at the time of thermal change, the material of the second optical unit 353 is preferably the same as the material of the first optical unit 352, but another material may be used.

Recessed space 359 having a rectangular opening is formed on the front surface side of the second optical unit 353. A plurality of lenses 360 corresponding to individual channels is integrally formed in a horizontally aligned state at a bottom portion of the space 359. This configuration can increase the precision of the position of the lens 360 with respect to a core 371 of the optical fiber 370 installed in the second optical unit 353 all at the same time in a plurality of channels.

Furthermore, a plurality of optical fiber insertion holes 357 extending from the back surface side to the front is provided in the second optical unit 353 in a horizontally aligned state in accordance with the lenses 360 of the channels. The optical fiber 370 has double structure of the core 371 in the center portion of an optical path and a clad 372 covering the periphery of the core 371.

The optical fiber insertion hole 357 of each channel is shaped such that the core 371 of the optical fiber 370 to be inserted into the optical fiber insertion hole 357 and the optical axis of the corresponding lens 360 match each other. Furthermore, the optical fiber insertion hole 357 of each channel is shaped such that the bottom position of the optical fiber insertion hole 357, that is, the abutting position of the tip (emission end) of the optical fiber 370 in a case where the optical fiber 370 is inserted matches the focal position of the lens 360.

Furthermore, the adhesive injection hole 358 extending downward from the upper surface side is formed in the second optical unit 353 so as to communicate with the vicinity of the bottom position of a plurality of optical fiber insertion holes 357 in the horizontally aligned state. After the optical fiber 370 is inserted into the optical fiber insertion hole 357, an adhesive 362 is injected around the optical fiber 370 through the adhesive injection hole 358, whereby the optical fiber 370 is fixed to the second optical unit 353.

Here, if there is an air layer between the tip of the optical fiber 370 and the bottom position of the optical fiber insertion hole 357, light emitted from the lens 360 easily reflects at the bottom position, which deteriorates signal quality. Therefore, the adhesive 362 is desirably a light transmitting agent, and injected between the tip of the optical fiber 370 and the bottom position of the optical fiber insertion hole 357. This configuration can reduce the reflection.

As described above, the first optical unit 352 and the second optical unit 353 are connected to constitute the connector body 351. For example, a method of newly providing a recessed portion on one side and a projecting portion on the other side and fitting these portions as in the case of a boss or a method of adhesion and fixation by matching optical-axis positions of lenses with, for example, an image processing system can be adopted as the connection method.

In the reception side optical connector 300R, the optical path adjusting unit 355 has a function of adjusting an optical path such that the diameter of incident light is reduced while the incident angle is kept. The lens 360 has a function of collecting light whose optical path has been adjusted by the optical path adjusting unit 355. As a result, incident collimated light is input to the optical path adjusting unit 355, and the optical path is adjusted such that the diameter is reduced while the incident angle is kept. Then, the light whose optical path has been adjusted is incident on the lens 360 and collected. The collected light is incident on the incident end of the optical fiber 370, which is a light receiver, with a predetermined NA.

Figure 16:
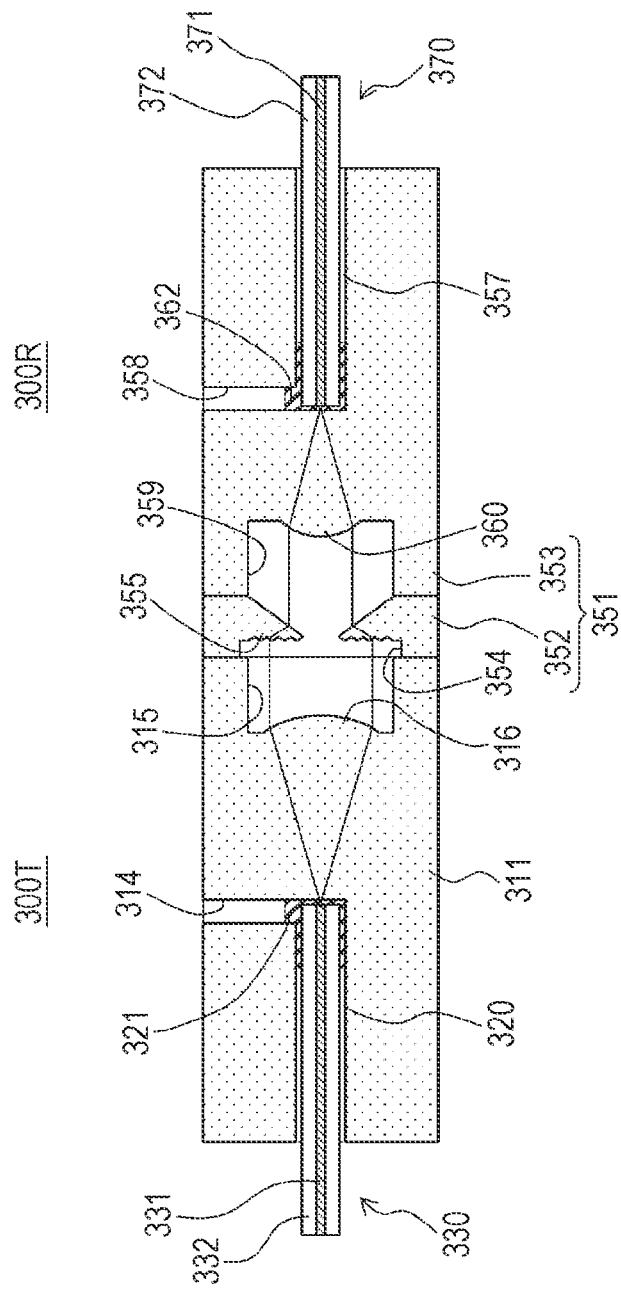
FIG. 16 is a cross-sectional view illustrating one example of a state in which the transmission side optical connector and the reception side optical connector are connected.

FIG. 16 is a cross-sectional view of the transmission side optical connector 300T and the reception side optical connector 300R, which constitute an optical coupling connector. In the illustrated example, the transmission side optical connector 300T and the reception side optical connector 300R are connected with each other.

In the transmission side optical connector 300T, light sent through the optical fiber 330 is emitted from the emission end of the optical fiber 330 with a predetermined NA. The emitted light is incident on the lens 316 to be shaped into collimated light. The collimated light is emitted toward the reception side optical connector 300R.

Furthermore, in the reception side optical connector 300R, light (collimated light) emitted from the transmission side optical connector 300T is incident on the optical path adjusting unit 355, and the optical path is adjusted such that the diameter is reduced while the incident angle is kept. The light whose optical path is adjusted is incident on the lens 360, and collected. Then, the collected light is incident on the incident end of the optical fiber 370, and sent through the optical fiber 370.

In the optical coupling connector configured as described above, the reception side optical connector 300R adjusts an optical path with the optical path adjusting unit 355 such that the diameter of the incident light is reduced while the incident angle is kept, collects the light whose optical path has been adjusted with the lens 360, and causes the light to be incident on the optical fiber 370, which is a light receiver. Therefore, while the incident angle of light to the optical fiber 370 satisfies an NA, the focal distance of the lens 360 is decreased. This can mitigate the coupling loss of optical power on the reception side due to an axis deviation on the transmission side. Here, the decreased focal distance of the lens 360 can decrease the distance from the lens 360 to the light collecting point. The deviation of the light collecting point on the reception side due to the axis deviation on the transmission side is inhibited.

Figure 17A:
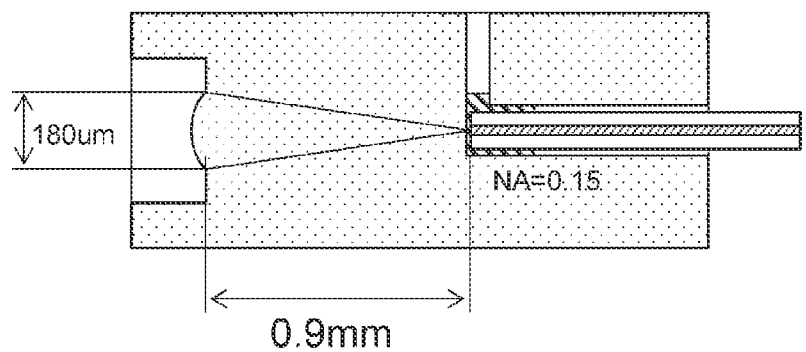
FIGS. 17A and 17B illustrate one example of the configuration of the reception side optical connector for simulating coupling efficiency of light.
Figure 17B:
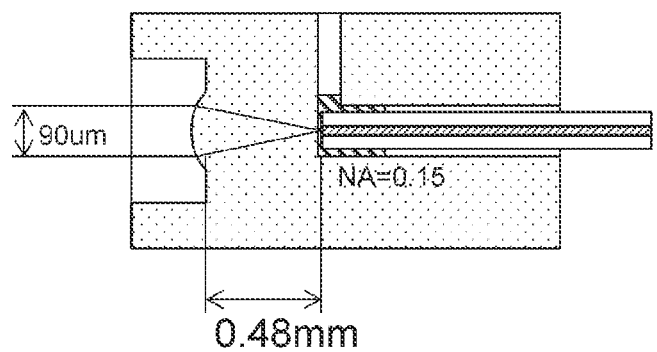

A simulation result of an effect of the present technology will be described. Here, an optical system having an optical fiber with an NA of 0.15 is used. The optical fiber has a mode field diameter (MFD) of 8 μm. FIG. 17A illustrates an example of the case where the collimate diameter is as large as 180 μm and the focal distance of a lens is as long as 0.9 mm. FIG. 17B illustrates an example of the case where the collimate diameter is as small as 90 μm and the focal distance of a lens is as short as 0.48 mm.

Figure 18:
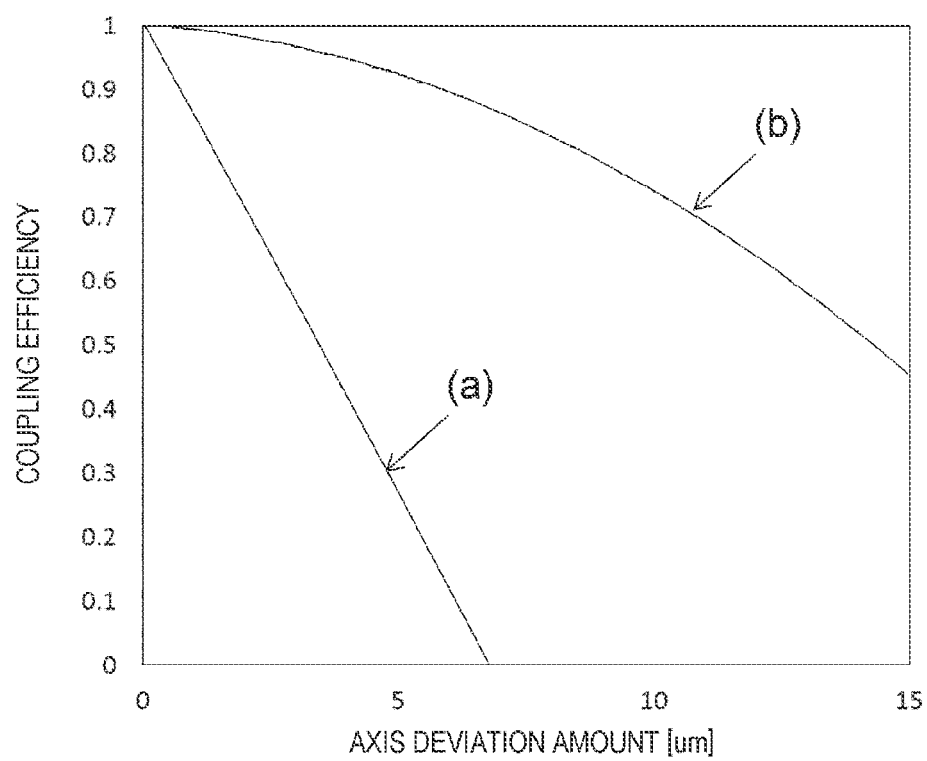
FIG. 18 is a graph illustrating one example of a simulation result of the coupling efficiency of light.
Figure 19A:
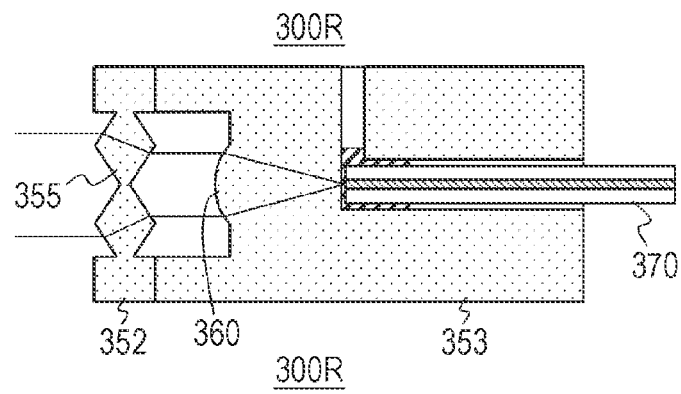
FIGS. 19A, 19B, 19C, 19D, and 19E illustrate a variation (not including a mirror) of the optical path adjusting unit.
Figure 19B:
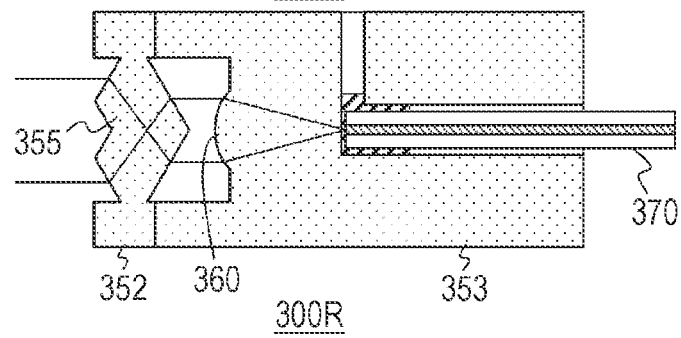
Figure 19C:
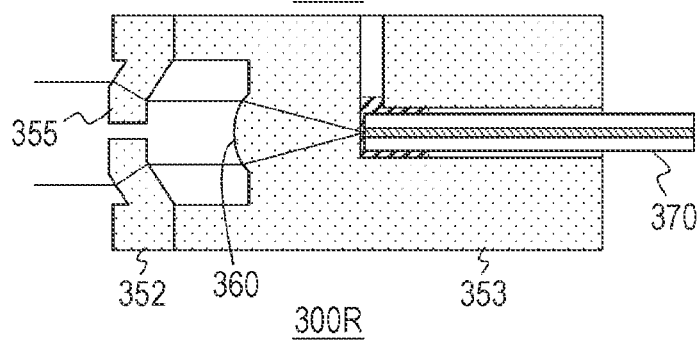
Figure 19D:
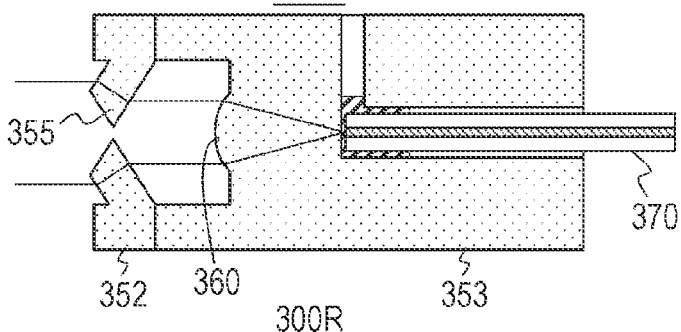
Figure 19E:
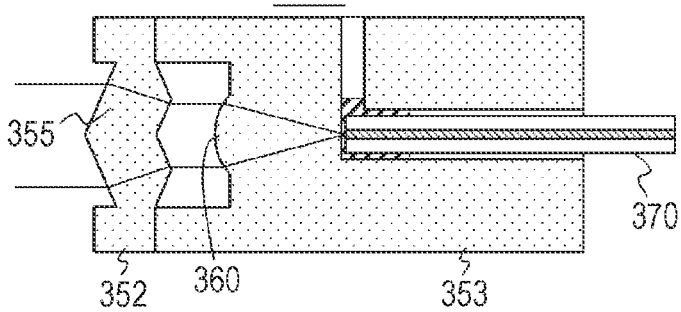

The graph of FIG. 18 illustrate a simulation result of the coupling efficiency of light input to the optical fiber on the reception side. The horizontal axis represents an axis deviation amount, that is, a deviation amount in a case where a light source is deviated vertically to the optical axis. The vertical axis represents the coupling efficiency of light on the reception side. The solid line (a) illustrates the relation between the axis deviation amount and the coupling efficiency in the example of FIG. 17A. The solid line-(b) illustrates the relation between the axis deviation amount and the coupling efficiency in the example of FIG. 17B.

Since the optical fiber has an MFD of 8 μm, for example, an axis deviation of 5 μm causes power loss of approximately 75 percent of the solid line (a) in a case of the example of FIG. 17A. In a case of the example of FIG. 17B, however, the power loss is approximately 10 percent of the solid line (b), and the power loss is significantly reduced.

Note that the effects described in the specification are merely illustration and not limitation, and additional effects may be exhibited.

FIGS. 19A, 19B, 19C, 19D, 19E, 20A, 20B, 20C, 20D, 20E, 21A, 21B, 21C, 21D, 21E, 22A, 22B, 22C, 22D, and 22E illustrate variations of the optical path adjusting unit 355. In these variations, the optical path adjusting unit 355 can adjust an optical path such that the diameter of incident light is reduced while the incident angle is kept. Note that the optical path adjusting unit 355 includes a mirror 365 in the variations of FIGS. 21A, 21B, 21C, 21D, 21E, 22A, 22B, 22C, 22D, and 22E. The optical path adjusting unit 355 including the mirror 365 can efficiently adjust an optical path, and reduce an amount of light to be lost.

[Other Configuration Examples of Reception Side Optical Connector]

Other various configurations can be considered as the configuration of the reception side optical connector in addition to the above-described reception side optical connector 300R (see FIG. 15).

"Another Configuration Example 1"

Figure 23:
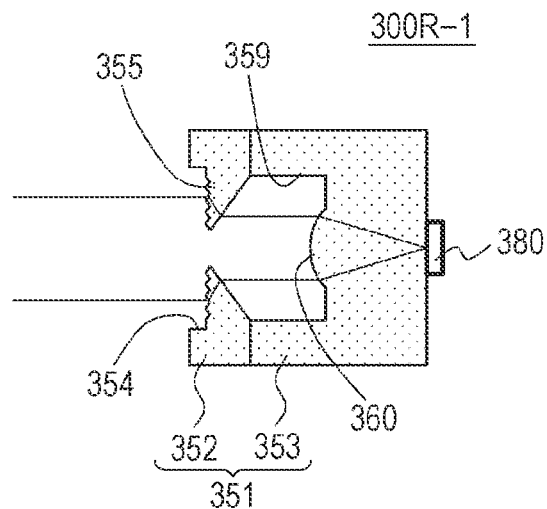
FIG. 23 is a cross-sectional view illustrating a reception side optical connector in another configuration example 1.

FIG. 23 is a cross-sectional view illustrating a reception side optical connector 300R-1 in another configuration example 1. In FIG. 23, the same sign is attached to a portion corresponding to that in FIG. 15, and detailed description thereof will be omitted as appropriate. In the reception side optical connector 300R-1, the light receiver fixed to the second optical unit 353 is not the optical fiber 370 but a light receiving element 380 such as a photodiode (PD).

In this case, a plurality of light receiving elements 380 is fixed to the back surface side of the second optical unit 353 in a horizontally aligned state in accordance with the lens 360 of each channel. Then, in this case, the light receiving element 380 of each channel is fixed such that the incident portion of the light receiving element 380 matches the optical axis of the corresponding lens 360. Furthermore, in this case, for example, the thickness of the second optical unit 353 in the optical-axis direction is set such that the incident portion of the light receiving element 380 of each channel matches the focal position of the corresponding lens 360.

In the reception side optical connector 300R-1, incident collimated light is input to the optical path adjusting unit 355, and the optical path is adjusted such that the diameter is reduced while the incident angle is kept. Then, the light whose optical path has been adjusted is incident on the lens 360 and collected. The collected light is incident on the incident portion (light receiving unit) of the light receiving element 380, which is a light receiver.

Such configuration in which the light receiving element 380 is fixed to the second optical unit 353 eliminates the need for an optical fiber at the time when transmitted light is incident on the light receiving element 380, which can reduce costs.

"Another Configuration Example 2"

Figure 24:
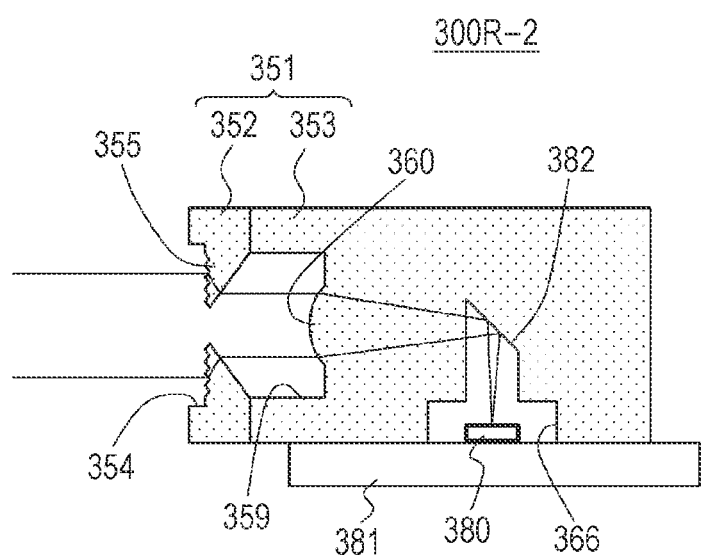
FIG. 24 is a cross-sectional view illustrating a reception side optical connector in another configuration example 2.

FIG. 24 is a cross-sectional view illustrating a reception side optical connector 300R-2 in another configuration example 2. In FIG. 24, the same sign is attached to a portion corresponding to those in FIGS. 15 and 23, and detailed description thereof will be omitted as appropriate. In the transmission side optical connector 300R-2, a substrate 381 on which the light receiving element 380 is mounted is fixed to the lower surface side of the connector body 351. In this case, a plurality of light receiving elements 380 is mounted on the substrate 381 in a horizontally aligned state in accordance with the lens 360 of each channel.

A hole 366 for placing a light receiving element extending upward from the lower surface side is formed in the second optical unit 353. Then, the bottom portion of the hole 366 for placing a light receiving element is made to be an inclined surface in order to change the direction of an optical path of light collected by the lens 360 of each channel into a direction of the corresponding light receiving element 380. A mirror 382 is placed on the inclined surface. Note that a separately generated mirror 382 may be not only fixed on the inclined surface but formed on the inclined surface by, for example, vapor deposition.

Here, the position of the substrate 381 is adjusted and the substrate 381 is fixed such that the incident portion of the light receiving element 380 of each channel matches the optical axis of the corresponding lens 360. Furthermore, in this case, for example, the formation position of the lens 360 and the formation position/length of the hole 366 for placing a light receiving element are set such that the incident portion of the light receiving element 380 of each channel matches the focal position of the corresponding lens 360.

In the reception side optical connector 300R-2, incident collimated light is input to the optical path adjusting unit 355, and the optical path is adjusted such that the diameter is reduced while the incident angle is kept. Then, the light whose optical path has been adjusted is incident on the lens 360 and collected. The collected light is incident on the incident portion (light receiving unit) of the light receiving element 380 after the optical path is changed by the mirror 382.

Fixing the substrate 381 on which the light receiving element 380 is mounted to the connector body 351 in such a way eliminates the need for an optical fiber at the time when an optical signal is transmitted from the light receiving element 380, which can reduce costs. Furthermore, the configuration in which light collected by the lens 360 is incident on the light receiving element 380 after the optical path is changed by the mirror 382 facilitates mounting, and can increase the degree of freedom in design.

"Another Configuration Example 3"

Figure 25:
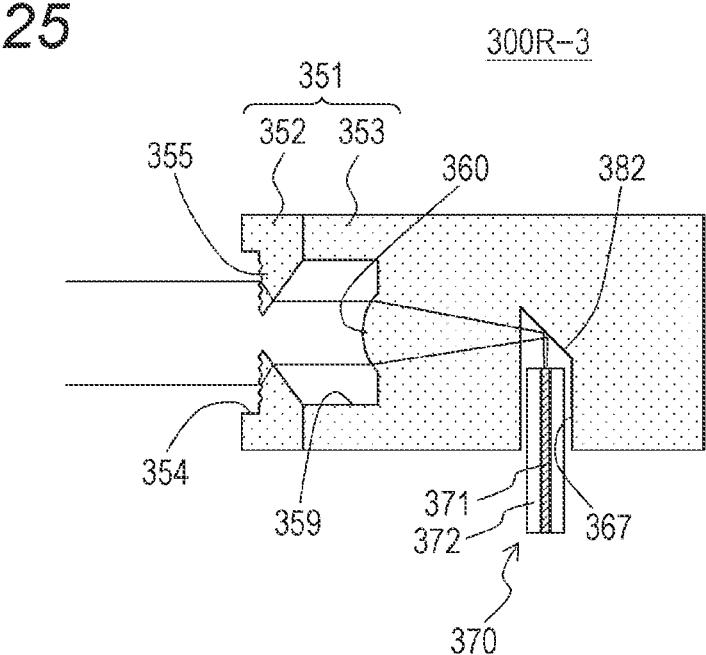
FIG. 25 is a cross-sectional view illustrating a reception side optical connector in another configuration example 3.

FIG. 25 is a cross-sectional view illustrating a reception side optical connector 300R-3 in another configuration example 3. In FIG. 25, the same sign is attached to a portion corresponding to those in FIGS. 15 and 24, and detailed description thereof will be omitted as appropriate. In the transmission side optical connector 300R-3, a plurality of optical fiber insertion holes 367 extending upward from the lower surface side is formed in the second optical unit 353 in a horizontally aligned state in accordance with the lenses 360 of the channels.

The bottom portion of each optical fiber insertion hole 367 is made to be an inclined surface in order to change the direction of light collected by the lens 360 of each channel into a direction of the corresponding optical fiber 370. The mirror 382 is placed on the inclined surface. Furthermore, each optical fiber insertion hole 367 is shaped such that the core 371 of the optical fiber 370 to be inserted into the optical fiber insertion hole 367 and the optical axis of the corresponding lens 360 match each other.

The optical fiber 370 of each corresponding channel is inserted into each optical fiber insertion hole 367. The optical fiber 370 is fixed by, for example, injecting an adhesive (not illustrated) around the optical fiber 370. In this case, the insertion position of the optical fiber 370 is set such that the tip (incident end) of the optical fiber 370 matches the focal position of the corresponding lens 360, thus, such that the tip (incident end) of the optical fiber 370 is positioned a certain distance away from the mirror 382.

In the reception side optical connector 300R-3, incident collimated light is input to the optical path adjusting unit 355, and the optical path is adjusted such that the diameter is reduced while the incident angle is kept. Then, the light whose optical path has been adjusted is incident on the lens 360 and collected. The collected light is incident on the incident end of the optical fiber 370 with a predetermined NA after the optical path is changed by the mirror 382.

In a case of the configuration example, the configuration of the second optical unit 353 as a ferrule with a lens can facilitate optical-axis alignment of the optical fiber 370 and the lens 360. Furthermore, in a case of the configuration example, the configuration in which an optical path of light toward the optical fiber 370 is changed by the mirror 382 facilitates mounting, and can increase the degree of freedom in design.

"Another Configuration Example 4"

Figure 26:
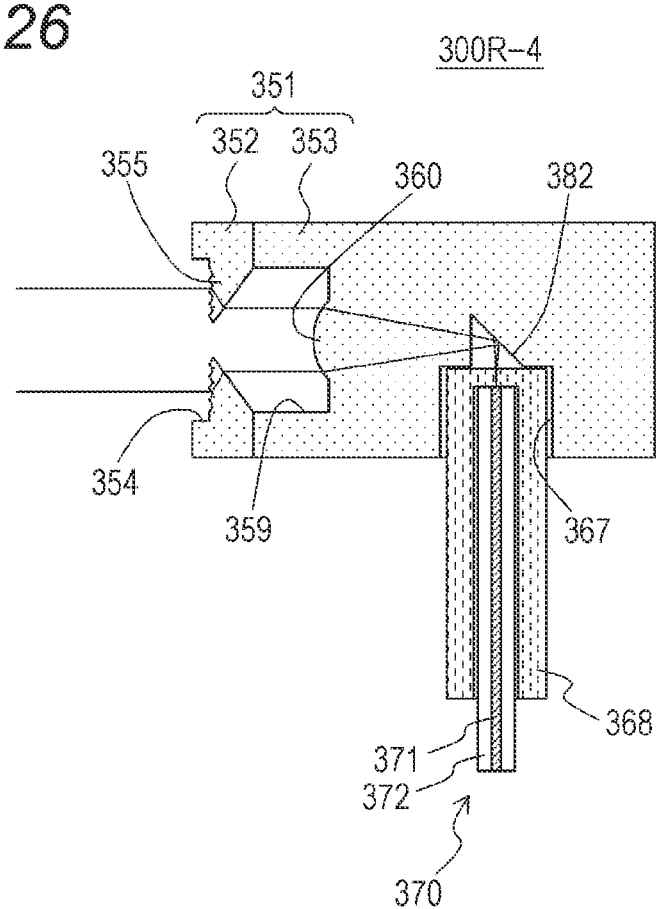
FIG. 26 is a cross-sectional view illustrating a reception side optical connector in another configuration example 4.

FIG. 26 is a cross-sectional view illustrating a reception side optical connector 300R-4 in another configuration example 4. In FIG. 26, the same sign is attached to a portion corresponding to those in FIGS. 15 and 25, and detailed description thereof will be omitted as appropriate. In the reception side optical connector 300R-4, the diameter of the optical fiber insertion hole 367 formed in the second optical unit 353 is increased. Then, a ferrule 368 to which the optical fiber 370 has been preliminarily fixed by abutting is inserted into the optical fiber insertion hole 367, and fixed by, for example, an adhesive (not illustrated). Such configuration makes it easy to keep the tip position of the optical fiber 370 a certain distance away from the mirror 382.

<2. Variations>

Note that, although an example in which an optical fiber of single mode is used has been described in the above-described embodiment, the present technology can be similarly applied to the case where an optical fiber of multi-mode is used, and is not limited to a specific NA. Furthermore, the mirror in the above-described embodiment may be implemented by another optical path changing unit. For example, an optical path changing unit utilizing total reflection using a refractive index can be considered.

Furthermore, although, in the above-described embodiment, an example in which the connector body 351 of the reception side optical connector 300R includes the first optical unit 352 including the optical path adjusting unit 355 and the second optical unit 353 including the lens 360 has been described, the connector body 351 may include one optical unit including the optical path adjusting unit 355 and the lens 360. For example, a 3D printer or such technology may be applied for manufacturing.

Furthermore, an example in which the lens 316 on the transmission side shapes collimated light has been described in the above-described embodiment, this is not limitative. FIGS. 27A and 27B illustrate an optical coupling connector that uses not collimated light but convergent light (light bent in a light collecting direction). In FIGS. 27A and 27B, the same sign is attached to a portion corresponding to that in FIGS. 3A and 3B.

As illustrated in FIG. 27A, in a case where light emitted from the optical fiber 15 on the transmission side is used as a light source, the deviation of the position of the light source significantly deviates a light collecting point on the reception side (see broken lines). This is because the convergent light in the lens 11 is thrown into disorder and obliquely input to the lens 21 on the reception side, which deviates a light collecting point.

As illustrated in FIG. 27B, however, in a case where the distance between the lens 21 and the optical fiber 25 on the reception side is short, a deviation amount of the light collecting point is reduced as compared to the case of FIG. 27A even if the position of the light source is deviated (see broken lines). As a result, the coupling loss of optical power on the reception side due to an optical-axis deviation on the transmission side can be reduced by decreasing the distance between the lens 21 on the reception side and the light collecting point even not in a case where the lens 11 on the transmission side shapes collimated light.

Although the preferred embodiment of the disclosure has been described in detail above with reference to the accompanying drawings, the technical scope of the disclosure is not limited to such an example. It is obvious that a person having ordinary skill in the art of the disclosure can arrive at various alternations or modifications within the scope of the technical ideas set forth in the claims. These alternations or modifications are understood to naturally fall within the technical scope of the disclosure.

Furthermore, the effects described herein are merely illustrative or exemplary, and not limitative. That is, the technique according to the disclosure may have other effects that are obvious to a skilled person from the description of the specification, together with or in place of the above-described effects.

Note that the present technology can also have the configurations as follows.

(1) An optical connector including
a connector body including: an optical path adjusting unit that adjusts an optical path such that a diameter of incident light is reduced while an incident angle is kept; and a lens that collects light whose optical path has been adjusted by the optical path adjusting unit, and causes the light to be incident on a light receiver.

(2) The optical connector according to (1),
in which the optical path adjusting unit has a through hole in a central portion.

(3) The optical connector according to (1) or (2),
in which the optical path adjusting unit includes an optical path changing unit.

(4) The optical connector according to any one of claims (1) to (3),
in which the connector body includes a first optical unit including the optical path adjusting unit and a second optical unit including the lens.

(5) The optical connector according to any one of (1) to (4),
in which the light receiver is an optical fiber, and
the connector body has an insertion hole into which the optical fiber is inserted.

(6) The optical connector according to (5),
in which the connector body includes an optical path changing unit that changes an optical path at a bottom portion of the insertion hole, and light collected by the lens is incident on the optical fiber after the optical path is changed by the optical path changing unit.

(7) The optical connector according to (6),
in which a ferrule into which the optical fiber is inserted and fixed is inserted into the insertion hole.

(8) The optical connector according to any one of (1) to (4),
in which the light receiver is a light receiving element that converts an optical signal into an electric signal.

(9) The optical connector according to (8),
in which the light receiving element is connected to the connector body, and
light collected by the lens is incident on the light receiving element without change of an optical path.

(10) The optical connector according to (8),
in which the connector body includes an optical path changing unit that changes an optical path,
the light receiving element is fixed on a substrate, and
light collected by the lens is incident on the light receiving element after the optical path is changed by the optical path changing unit.

(11) The optical connector according to any one of (1) to (10),
in which light incident on the optical path adjusting unit is collimated light.

(12) The optical connector according to any one of (1) to (11),
in which the connector body
includes a light-transmitting material, and
integrally includes the optical path adjusting unit and the lens.

(13) The optical connector according to any one of (1) to (12),
in which the connector body includes a plurality of combinations of the optical path adjusting unit and the lens.

(14) The optical connector according to any one of (1) to (13),
in which the connector body includes a recessed light incident portion, and
the optical path adjusting unit is positioned at a bottom portion of the light incident portion.

(15) The optical connector according to any one of (1) to (14),
in which the connector body integrally includes, on a front surface side, a projecting or recessed position restricting portion that is used for position alignment with a connector on a side to be connected.

(16) The optical connector according to any one of (1) to (15), further including
the light receiver.

(17) An optical cable including an optical connector serving as a plug,
in which the optical connector includes
a connector body including: an optical path adjusting unit that adjusts an optical path such that a diameter of incident light is reduced while an incident angle is kept; and a lens that collects light whose optical path has been adjusted by the optical path adjusting unit, and causes the light to be incident on a light receiver.

(18) An electronic device including an optical connector serving as a receptacle,
in which the optical connector includes
a connector body including: an optical path adjusting unit that adjusts an optical path such that a diameter of incident light is reduced while an incident angle is kept; and a lens that collects light whose optical path has been adjusted by the optical path adjusting unit, and causes the light to be incident on a light receiver.

REFERENCE SIGNS LIST

100 Electronic device
101 Optical communication unit
102 Light emitting unit
103, 104 Optical transmission line
105 Light receiving unit
200A, 200B Optical cable
201A, 201B Cable body
300T Transmission side optical connector
300R, 300R-1 to 300R-4 Reception side optical connector
311 Connector body
314 Adhesive injection hole
315 Light emitting portion
316 Lens
317 Position restricting portion
320 Optical fiber insertion hole
321 Adhesive
330 Optical fiber
331 Core
332 Clad
351 Connector body
352 First optical unit
353 Second optical unit
354 Light incident portion
355 Optical path adjusting unit
356 Position restricting portion
357 Optical fiber insertion hole
358 Adhesive insertion hole
359 Space
360 Lens
361 Opening
362 Adhesive
363 Through hole
365 Mirror
366 Hole for placing light receiving element
367 Optical fiber insertion hole
368 Ferrule
370 Optical fiber
371 Core
372 Clad
380 Light receiving element
381 Substrate
382 Mirror

The invention claimed is:
1. An optical connector, comprising:
a connector body including:
an optical path adjusting unit that adjusts an optical path such that a diameter of incident light is reduced while an incident angle is kept;
a lens that:
collects light whose optical path has been adjusted by the optical path adjusting unit, and
controls the light to be incident on a light receiver;
an insertion hole into which the light receiver is inserted; and
an optical path changing unit that changes an optical path of the light at a bottom portion of the insertion hole.

2. The optical connector according to claim 1, wherein the optical path adjusting unit has a through hole in a central portion.

3. The optical connector according to claim 1, wherein the connector body includes a first optical unit including the optical path adjusting unit and a second optical unit including the lens.

4. The optical connector according to claim 1, wherein the light receiver is an optical fiber, and the optical fiber is inserted into the insertion hole.

5. The optical connector according to claim 4, wherein the light collected by the lens is incident on the optical fiber after the optical path is changed by the optical path changing unit.

6. The optical connector according to claim 5, wherein
a ferrule is inserted into the insertion hole, and
the optical fiber is inserted and fixed into the ferrule.

7. The optical connector according to claim 1, wherein the light receiver is a light receiving element that converts an optical signal into an electric signal.

8. The optical connector according to claim 7, wherein the light receiving element is connected to the connector body, and light collected by the lens is incident on the light receiving element without change of an optical path.

9. The optical connector according to claim 7, wherein
the light receiving element is fixed on a substrate, and
the light collected by the lens is incident on the light receiving element after the optical path is changed by the optical path changing unit.

10. The optical connector according to claim 1, wherein light incident on the optical path adjusting unit is collimated light.

11. The optical connector according to claim 1, wherein the connector body includes a light-transmitting material, and integrally includes the optical path adjusting unit and the lens.

12. The optical connector according to claim 1, wherein the connector body includes a plurality of combinations of the optical path adjusting unit and the lens.

13. The optical connector according to claim 1, wherein the connector body includes a recessed light incident portion, and the optical path adjusting unit is positioned at a bottom portion of the light incident portion.

14. The optical connector according to claim 1, wherein the connector body integrally includes, on a front surface side, a projecting or recessed position restricting portion that is used for position alignment with a connector on a side to be connected.

15. The optical connector according to claim 1, further comprising the light receiver.

16. An optical cable, comprising:
an optical connector serving as a plug, wherein the optical connector includes a connector body including:
an optical path adjusting unit that adjusts an optical path such that a diameter of incident light is reduced while an incident angle is kept;
a lens that:
collects light whose optical path has been adjusted by the optical path adjusting unit, and
controls the light to be incident on a light receiver;
an insertion hole into which the light receiver is inserted; and
an optical path changing unit that changes an optical path of the light at a bottom portion of the insertion hole.

17. An electronic device, comprising:
an optical connector serving as a receptacle, wherein the optical connector includes a connector body including:
  an optical path adjusting unit that adjusts an optical path such that a diameter of incident light is reduced while an incident angle is kept;
  a lens that:
    collects light whose optical path has been adjusted by the optical path adjusting unit, and
    controls the light to be incident on a light receiver;
  an insertion hole into which the light receiver is inserted; and
  an optical path changing unit that changes an optical path of the light at a bottom portion of the insertion hole.

* * * * *